US012688214B2

(12) United States Patent
Noh et al.

(10) Patent No.: US 12,688,214 B2
(45) Date of Patent: Jul. 21, 2026

(54) ELECTRONIC DEVICE, METHOD AND STORAGE MEDIUM FOR PROVIDING SEARCH BOX INCLUDING REFERENCE TEXT

(71) Applicant: SAMSUNG ELECTRONICS CO., LTD., Suwon-si (KR)

(72) Inventors: Maria Noh, Suwon-si (KR); Misung Kim, Suwon-si (KR); Eunbi Kim, Suwon-si (KR); Sunhye Kim, Suwon-si (KR); Yeji Park, Suwon-si (KR); Jaewon Jeong, Suwon-si (KR); Kyoungwoon Hahm, Suwon-si (KR); Taehun Kim, Suwon-si (KR); Wonsuk Yang, Suwon-si (KR); Junhyuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/949,531

(22) Filed: Nov. 15, 2024

(65) Prior Publication Data

US 2025/0156461 A1 May 15, 2025

Related U.S. Application Data

(63) Continuation of application No. PCT/KR2024/096499, filed on Nov. 13, 2024.

(30) Foreign Application Priority Data

Nov. 15, 2023  (KR) ........................ 10-2023-0158667
Feb. 29, 2024  (KR) ........................ 10-2024-0029610

(51) Int. Cl.
*G06F 16/334*      (2025.01)
*G06N 5/02*        (2023.01)

(52) U.S. Cl.
CPC .......... *G06F 16/3344* (2019.01); *G06N 5/02* (2013.01)

(58) Field of Classification Search
CPC .................................................. G06F 16/3344
See application file for complete search history.

(56) References Cited

U.S. PATENT DOCUMENTS

2013/0111487 A1      5/2013   Cheyer et al.
2016/0350304 A1*    12/2016   Aggarwal ............... G10L 15/26
                              (Continued)

FOREIGN PATENT DOCUMENTS

JP        2017-129752 A     7/2017
KR    10-2019-0086783 A     7/2019
                  (Continued)

OTHER PUBLICATIONS

International Search Report (PCT/ISA/210) issued by the International Searching Authority on Feb. 18, 2025 in corresponding International Application No. PCT/KR2024/096499.
(Continued)

*Primary Examiner* — Van H Oberly
(74) *Attorney, Agent, or Firm* — Sughrue Mion, PLLC

(57) ABSTRACT

An electronic device includes a display; at least one processor; and at least one memory storing a knowledge graph, where the at least one memory stores instructions that, when executed by the at least one processor, cause the electronic device to perform at least one operation, and where the at least one operation includes: based on an occurrence of a trigger, identifying context information; displaying, through the display, a first reference text determined based on the context information and at least one node of the knowledge graph in a search box; displaying, through the display, a text corresponding to the first reference text in the search box according to a user input identical to part of the first
(Continued)

reference text; based on the text and the at least one node of the knowledge graph, searching for a first content; and displaying, through the display, the searched first content.

19 Claims, 21 Drawing Sheets

(56) References Cited

U.S. PATENT DOCUMENTS

| | | | |
|---|---|---|---|
| 2016/0357393 A1 | 12/2016 | Gross | |
| 2019/0057297 A1 | 2/2019 | Barri et al. | |
| 2019/0370397 A1* | 12/2019 | Kummamuru | G06F 40/295 |
| 2020/0118010 A1 | 4/2020 | Lee et al. | |
| 2020/0133211 A1 | 4/2020 | Lee et al. | |
| 2020/0134017 A1 | 4/2020 | Arar et al. | |
| 2020/0134477 A1 | 4/2020 | Lee et al. | |
| 2021/0117214 A1 | 4/2021 | Presant et al. | |
| 2021/0342541 A1* | 11/2021 | Taylor | G06F 40/295 |
| 2022/0067115 A1* | 3/2022 | Zheng | G06N 3/044 |
| 2023/0169357 A1 | 6/2023 | Lee et al. | |
| 2023/0177356 A1 | 6/2023 | Choi et al. | |
| 2023/0186162 A1* | 6/2023 | Rana | G06N 3/045 |
| | | | 706/12 |

FOREIGN PATENT DOCUMENTS

| | | | |
|---|---|---|---|
| KR | 10-2020-0042739 A | 4/2020 | |
| KR | 10-2020-0047205 A | 5/2020 | |
| KR | 10-2020-0052448 A | 5/2020 | |
| KR | 10-2022-0014713 A | 2/2022 | |
| KR | 10-2022-0083789 A | 6/2022 | |
| KR | 10-2023-0082186 A | 6/2023 | |
| KR | 10-2023-0096122 A | 6/2023 | |

OTHER PUBLICATIONS

Written Opinion (PCT/ISA/237) issued by the International Searching Authority on Feb. 18, 2025 in corresponding International Application No. PCT/KR2024/096499.

* cited by examiner

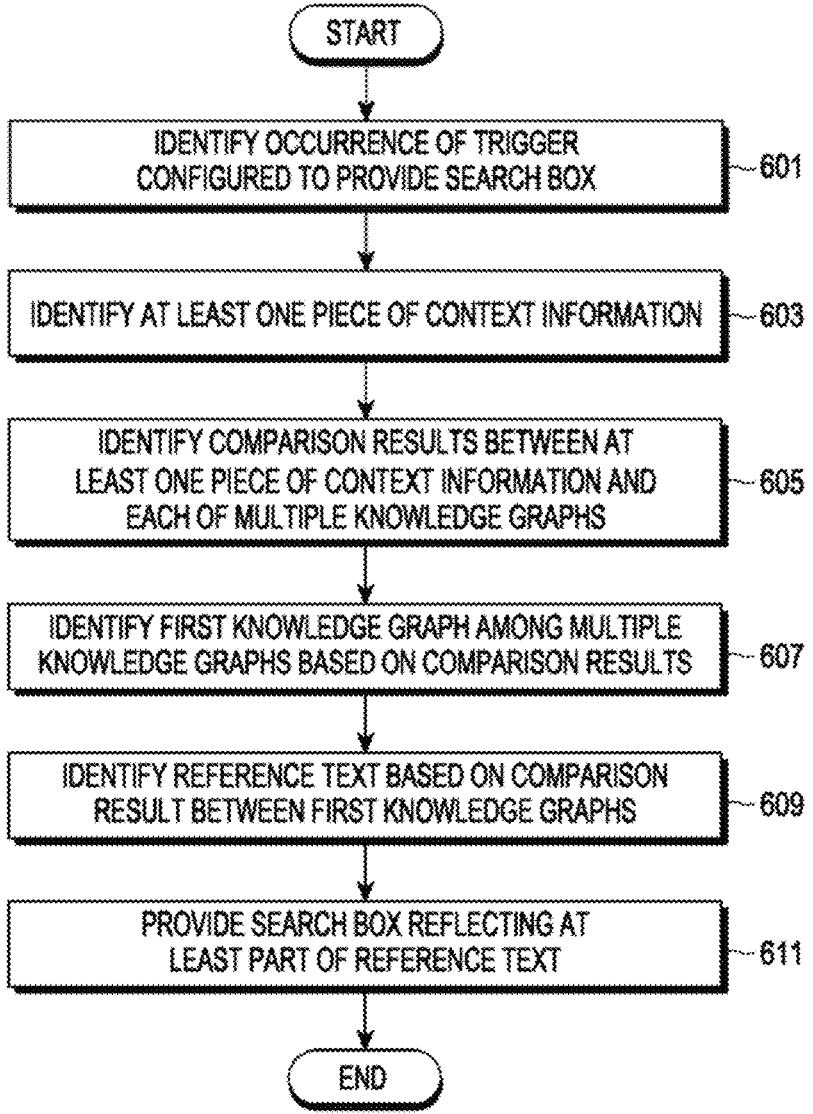

START

IDENTIFY OCCURRENCE OF TRIGGER
CONFIGURED TO PROVIDE SEARCH BOX ~601

IDENTIFY AT LEAST ONE PIECE OF CONTEXT INFORMATION ~603

IDENTIFY COMPARISON RESULTS BETWEEN AT
LEAST ONE PIECE OF CONTEXT INFORMATION AND
EACH OF MULTIPLE KNOWLEDGE GRAPHS ~605

IDENTIFY FIRST KNOWLEDGE GRAPH AMONG MULTIPLE
KNOWLEDGE GRAPHS BASED ON COMPARISON RESULTS ~607

IDENTIFY REFERENCE TEXT BASED ON COMPARISON
RESULT BETWEEN FIRST KNOWLEDGE GRAPHS ~609

PROVIDE SEARCH BOX REFLECTING AT
LEAST PART OF REFERENCE TEXT ~611

END

FIG. 6

ELECTRONIC DEVICE, METHOD AND STORAGE MEDIUM FOR PROVIDING SEARCH BOX INCLUDING REFERENCE TEXT

CROSS-REFERENCE TO RELATED APPLICATION(S)

This application is a continuation application, claiming priority under § 365 (c), of an International application No. PCT/KR2024/096499, filed on Nov. 13, 2024, which is based on and claims the benefit of a Korean patent application number 10-2023-0158667, filed on Nov. 15, 2023, in the Korean Intellectual Property Office, and of a Korean patent application number 10-2024-0029610, filed on Feb. 29, 2024, in the Korean Intellectual Property Office, the disclosure of each of which is incorporated by reference herein in its entirety.

BACKGROUND

1. Field

The disclosure relates to an electronic device, method and storage medium for providing a search box including reference text.

2. Description of Related Art

More and more services and additional functions are being provided through electronic devices, e.g., smartphones, or other portable electronic devices. To meet the needs of various users and raise use efficiency of electronic devices, communication service carriers or device manufacturers are competing to develop electronic devices with differentiated and diversified functionalities. The electronic device may provide various functions and/or execute various applications. In order to allow the user to use various functions and/or applications of the electronic device, the electronic device may support a search box for searching for functions and/or applications.

For example, the user may input text in the search box provided by the electronic device through a soft input panel (SIP). The electronic device may provide at least one piece of information associated with the function and/or the application corresponding to the text input in the search box. The user may select at least one piece of information provided, and the electronic device may execute the function corresponding to the selected information and/or the application. When a search box is initially called, the electronic device may provide only a search box, or may provide a search box including fixed text (which may be, e.g., search, but is not limited thereto).

The above-described information may be provided as related art for the purpose of helping understanding of the disclosure.

SUMMARY

According to an embodiment, the electronic device may include a display. The electronic device may comprise at least one processor. The electronic device may comprise at least one memory storing a knowledge graph. The at least one memory may include instructions that, when executed by the at least one processor, cause the electronic device to perform at least one operation. The at least one operation may include identifying context information based on an occurrence of a trigger. The at least one operation may include displaying, through the display (160), a first reference text determined based on the context information and at least one node of the knowledge graph in a search box. The at least one operation may include displaying, through the display (160), a text corresponding to the first reference text in the search box according to a user input identical to part of the first reference text. The at least one operation may include based on the text and at least one node of the knowledge graph, searching for a first content. The at least one operation may include displaying, through the display (160), the searched first content.

According to an embodiment, there may be provided a method for providing a search box including a reference text. The method may comprise include identifying context information based on an occurrence of a trigger. The method may comprise displaying, through the display (160), a first reference text determined based on the context information and at least one node of the knowledge graph in a search box. The method may comprise displaying, through the display (160), a text corresponding to the first reference text in the search box according to a user input identical to part of the first reference text. The method may comprise based on the text and at least one node of the knowledge graph, searching for a first content. The method may comprise displaying, through the display (160), the searched first content.

According to an embodiment, there may be provided a computer-readable storage medium storing at least one instruction. The at least one instruction may, when executed by the processor of the electronic device, cause the electronic device to perform at least one operation. The at least one operation may include identifying context information based on an occurrence of a trigger. The at least one operation may include displaying, through the display (160), a first reference text determined based on the context information and at least one node of the knowledge graph in a search box. The at least one operation may include displaying, through the display (160), a text corresponding to the first reference text in the search box according to a user input identical to part of the first reference text. The at least one operation may include based on the text and at least one node of the knowledge graph, searching for a first content. The at least one operation may include displaying, through the display (160), the searched first content.

BRIEF DESCRIPTION OF DRAWINGS

The above and other aspects, features, and advantages of certain embodiments of the present disclosure will be more apparent from the following description taken in conjunction with the accompanying drawings, in which:

FIG. 6 is a flowchart illustrating a method for identifying a reference text according to an embodiment;

DETAILED DESCRIPTION

Figure 1:
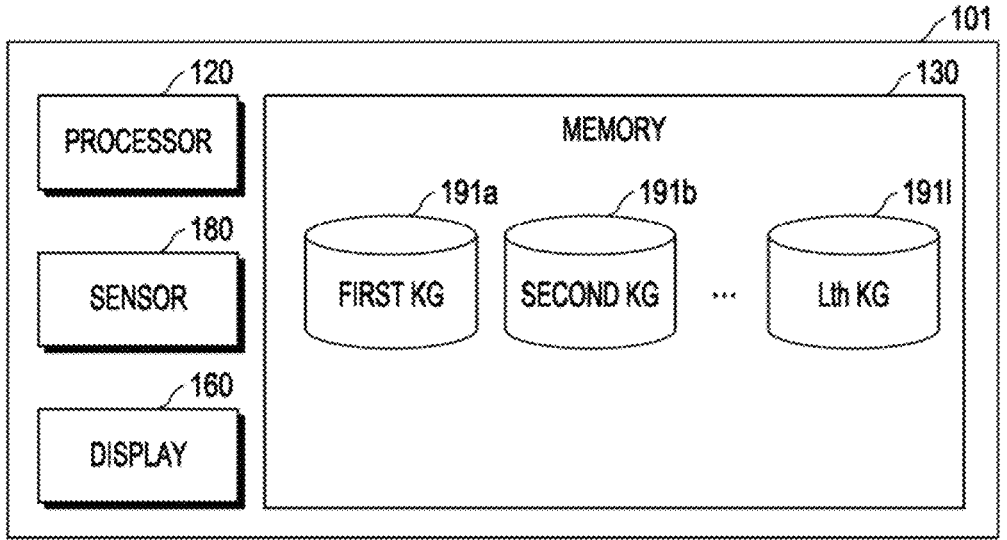
FIG. 1 is a block diagram illustrating an electronic device according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a block diagram illustrating an electronic device according to an embodiment.

According to an embodiment, an electronic device 101 may include a processor 120, memory 130, a display 160, and/or a sensor 180. In an embodiment, at least one of the components may be omitted from the electronic device 101, or one or more other components may be added to the electronic device 101. In an embodiment, some of the components may be integrated into one component, and their implementation is not limited.

The processor 120 may execute, e.g., at least one instruction stored in the memory 130. The memory 130 may store at least one instruction, and the at least one instruction may be executed by the processor 120. For example, the memory 130 may include non-volatile memory and/or volatile memory, but is not limited thereto. The memory 130 may include a hard disk, ROM, RAM, cache memory, and/or a register, but is not limited thereto. Some of the above-described entities (which may be, e.g., registers but are not limited) may be implemented as part of the processor 120, and the implementation form thereof is not limited. The at least one instruction, when executed by the processor 120, may cause the electronic device 101 to perform at least one operation. For example, as at least one instruction is executed, at least one other component may be controlled, and/or various types of data processing or computation may be performed. As at least part of data processing or computation, the processor 120 may store a command or data received from another component in at least part of the memory 130, process the command or data stored in the memory 130, and store resulting data in the memory 130. The processor 120 may include a main processor (e.g., a central processing unit) including circuitry, or an auxiliary processor (e.g., a graphics processing unit, a neural processing unit, an image signal processor, a sensor hub processor, or a communication processor) that is operable independently from, or in conjunction with, the main processor. For example, performing a specific operation may mean that the specific operation is performed, e.g., by (or under the control of) one entity (e.g., the main processor). For example, performing a specific operation may mean that the specific operation is performed, e.g., by (or under the control of) a plurality of entities (e.g., the main processor and one or more auxiliary processors, but not limited thereto). For example, performing a plurality of operations may mean that all of the plurality of operations are performed, e.g., by (or under the control of) one entity (e.g., the main processor). For example, performing the plurality of operations may mean that some of the plurality of operations are performed by at least one entity, and the remaining some are performed by at least one other entity. In some examples, at least one instruction for performing a specific operation may be stored in one memory, or may be distributed and individually stored in a plurality of memories—this disclosure will reference both one memory or a plurality memories as memory 130. The memory 130 may store at least one knowledge graph (KG) 191a, 191b, and 191 (L is a natural number of 1 or more, but is not limited thereto), which is described below in more detail.

The display 160 may visually provide information to the outside (e.g., a user) of the electronic device 101. For example, when the electronic device 101 is implemented as a smartphone, a tablet personal computer (PC), a video see through (VST) device, or a head-mounted device (HMD), the display 160 may include, e.g., a liquid crystal display (LCD) and a control means (e.g., a display driving integrated circuit (DDI)). The display 160 may further include a touch screen panel (TSP) and/or a control means (e.g., a TSP IC) for touch sensing. For example, when the electronic device 101 is implemented as an augmented reality (AR) glasses device, the display 160 may be implemented to include, e.g., a light radiation device, a light waveguide, and/or a control means. The processor 120 may control the display 160 to express an object. The expression of the object is described below. For example, the processor 120 may provide control data for enabling the expression of the object to the display 160, which may be expressed as the processor 120 controls the display 160.

The sensor 180 may include at least one sub sensor, e.g., a gyroscope, a magnetometer, a positioning sensor, and/or an accelerometer, but the type of device (or module) included in the sensor 180 is not limited. The sensor 180 may be implemented as, e.g., a motion processing unit (MPU) and/or an inertial measurement unit (IMU), but is not limited thereto.

The electronic device 101 may further include a communication circuit. The electronic device 101 may transmit/receive data to/from an external electronic device, e.g., a server, through the communication circuit. The electronic device 101 may request, e.g., a server to perform all or some of the operations performed by the electronic device 101 in various embodiments of the disclosure, and may receive the execution result in response to the request. As described below in more detail, the electronic device 101 may perform identification of context information, identification of a knowledge graph, comparison between the knowledge graph and the context information, and/or generation of a reference text based on the comparison result. The electronic device 101 may request the server to perform all or some of the identification of the context information, the identification of the knowledge graph, the comparison between the knowledge graph and the context information, and/or the generation of the reference text based on the comparison result, and may receive the execution result as a response to the request. The electronic device 101 may provide a search box including a reference text based on the execution result received from the server. Hereinafter, a process of generating a reference text by the electronic device 101 is described with reference to FIGS. 2A and 2B.

Figure 2A:
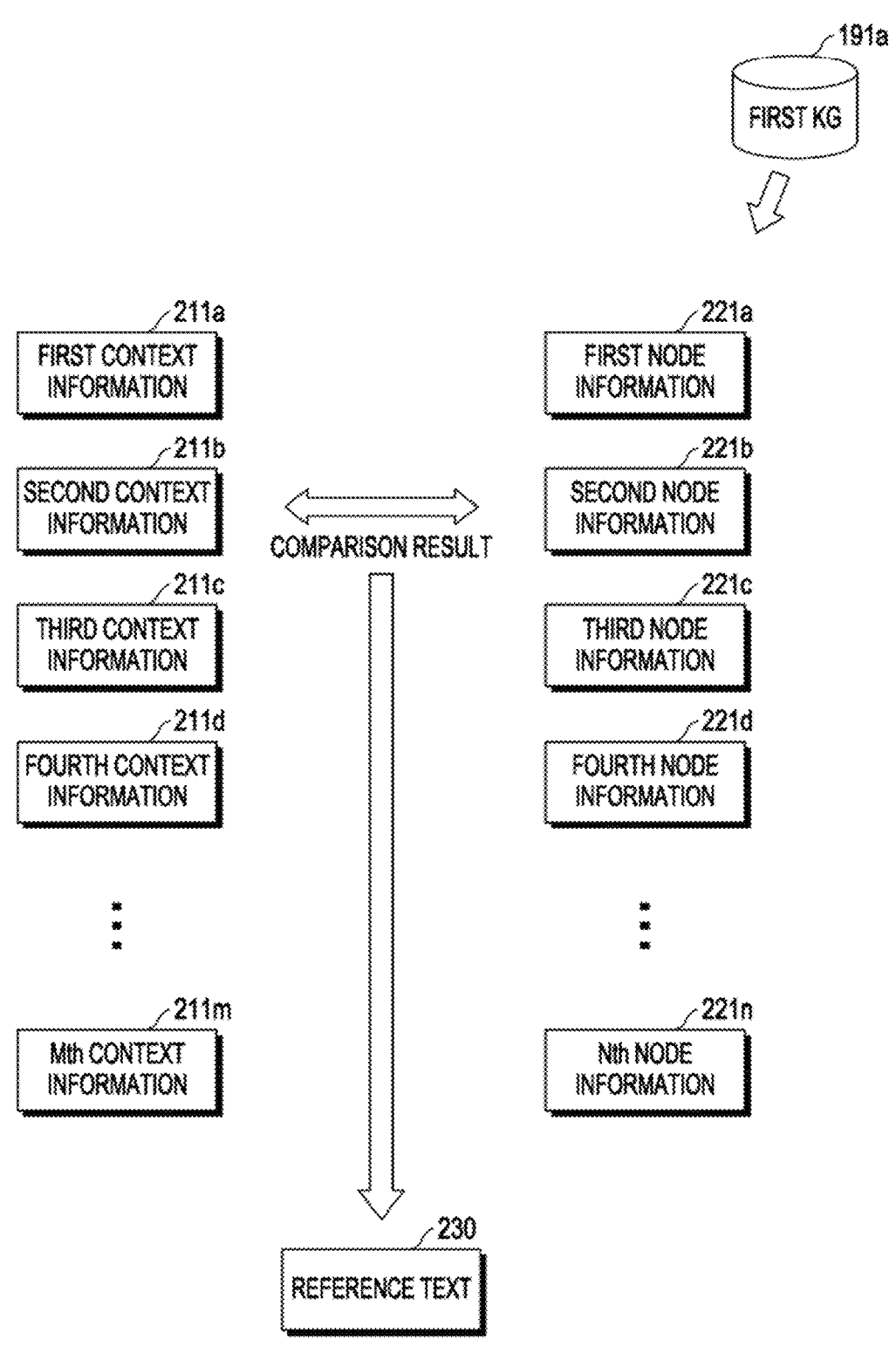
FIG. 2A is a view illustrating providing a reference text based on user context information and a knowledge graph according to an embodiment.

FIG. 2A is a view illustrating providing a reference text based on user context information and a knowledge graph.

According to an embodiment, the processor 120 may identify at least one piece of context information 211*a*, 211*b*, 211*c*, 211*d*, . . . , 211*m* (m is a natural number larger than or equal to 1, but is not limited thereto). The at least one piece of context information 211*a*, 211*b*, 211*c*, 211*d*, . . . , 211*m* may be information for representing the state of the user, the state of the environment including the user (or the electronic device 101), and/or the state of the electronic device 101, but is not limited thereto.

For example, the at least one piece of context information 211*a*, 211*b*, 211*c*, 211*d*, . . . , 211*m* may include information about the user activity (e.g., while exercising, listening to the music, driving, using an application, or the like, but is not limited thereto), as an example of the information about the state of the user. For example, the processor 120 may identify information about the user activity (e.g., information about whether the user is exercising, but is not limited) based on sensing data from the sensor 180, but the identification method thereof is not limited. For example, the processor 120 may identify information about the user activity (e.g., information about whether the user is listening to the music, whether the user is driving, or whether the user is using an application, but is not limited) based on the type of the currently running application, but the identification method thereof is not limited.

For example, the at least one piece of context information 211*a*, 211*b*, 211*c*, 211*d*, . . . , 211*m* may include information about biometric information identified based on the biometric signal of the user, as an example of the information about the state of the user. For example, the processor 120 may obtain a biometric signal (which may be, but is not limited to, e.g., photoplethysmogram (PPG), electrocardiogram (ECG), electroencephalogram (EEG), and/or electroencephalogram (EMG)) that is part of sensing data from the sensor 180 and, by using the same, identify information (which may be, but is not limited to, e.g., the blood pressure (BP), heart rate (HR), heart rate variability (HRV), per-band brain wave, and/or stress), but the identification method thereof is not limited.

For example, the at least one piece of context information 211*a*, 211*b*, 211*c*, 211*d*, . . . , 211*m* may include information about the social activity (which may be, e.g., a schedule, a financial payment, and/or Internet access, but is not limited thereto) of the user, as an example of the information about the state of the user. For example, the processor 120 may identify information about the user's social activity (e.g., schedule) based on information registered in the calendar application, information extracted from at least one text transmitted/received through the text application, and/or information extracted from an image identified through the Gallery application, but the identification method thereof is not limited thereto. For example, the processor 120 may identify information about the user's social activity (e.g., financial payment) based on information related to payment of the financial payment application and/or information extracted from at least one text transmitted/received through the text application, but the identification method thereof is not limited thereto. For example, the processor 120 may identify information about the user's social activity (e.g., Internet access) based on an access log identified through a web-browsing application, but the identification method thereof is not limited thereto.

For example, the at least one piece of context information 211*a*, 211*b*, 211*c*, 211*d*, . . . , 211*m* may include information about the user's preference (which may be preference for an application, preference for a keyword, and/or preference for a function of the electronic device 101, but is not limited thereto), as an example of the information about the state of the user. For example, the processor 120 may identify information about the user's preference (e.g., preference for the application) based on the number of executions, the execution frequency, and/or the usage time of the application, but the identification method thereof is not limited thereto. The processor 120 may identify information about the user's preference (e.g., preference for the function of the electronic device 101) based on the number of executions, the execution frequency, and/or the function duration for the function of the electronic device 101, but the identification method thereof is not limited thereto. The processor 120 may identify information about the user's preference (e.g., preference for an application) based on the number of searches for a keyword, the search frequency, and/or the amount of information stored in the electronic device 101 related to the keyword (e.g., an image having a classification result corresponding to the keyword, but is not limited), but the identification method thereof is not limited. For example, the user's preference may be identified based on a plurality of types of information. For example, a preference may be determined based on different types of information such as a search frequency of the keyword "spring" and the number of stored captured images for an object (e.g., a flower) associated with "spring", but the determination method thereof is not limited thereto.

For example, the at least one piece of context information 211*a*, 211*b*, 211*c*, 211*d*, . . . , 211*m* may include information about the usage pattern (or may be referred to as a history or a rule) of the electronic device 101 of the user, as an example of the information about the state of the user. For example, the processor 120 may identify the usage pattern (e.g., the usage pattern for the application) based on the usage pattern for the application, but the identification method thereof is not limited. For example, the processor 120 may identify the usage pattern (e.g., the usage pattern for the electronic device 101) based on the usage pattern for the function, but the identification method thereof is not limited.

For example, the at least one piece of context information 211*a*, 211*b*, 211*c*, 211*d*, . . . , 211*m* may identify information about the current time, as the information about the state of the environment including the user (or the electronic device 101). For example, the processor 120 may identify information about the current time based on the information about the time management application, but the identification method thereof is not limited thereto.

For example, the at least one piece of context information 211$a$, 211$b$, 211$c$, 211$d$, . . . , 211$m$ may identify information about information on the current location of the electronic device 101, as the information about the state of the environment including the user (or the electronic device 101). The electronic device 101 may identify information about the current location of the electronic device 101 based on a global positioning system (GPS), a Wi-Fi positioning system (WPS), and a simultaneous localization and mapping (SLAM), but the identification method thereof is not limited thereto.

For example, the at least one piece of context information 211$a$, 211$b$, 211$c$, 211$d$, . . . , 211$m$ may identify information about weather, as the information about the state of the environment including the user (or the electronic device 101). The processor 120 may identify information about weather based on information provided from, e.g., a weather forecast application, but the identification method thereof is not limited thereto.

For example, the at least one piece of context information 211$a$, 211$b$, 211$c$, 211$d$, . . . , 211$m$ may include information about the function of the electronic device 101, as the information about the state of the electronic device 101. For example, the processor 120 may identify the information about the function of the electronic device 101 based on the information about the number of executions of the function, the execution frequency, and/or the function duration, but the identification method thereof is not limited.

For example, the at least one piece of context information 211$a$, 211$b$, 211$c$, 211$d$, . . . , 211$m$ may include information about the configuration of the electronic device 101, as the information about the state of the electronic device 101. For example, the processor 120 may identify the information about the configuration of the electronic device 101 based on the information about the number of times, frequency, and/or duration associated with activation/deactivation of the configuration, but the identification method thereof is not limited.

For example, the at least one piece of context information 211$a$, 211$b$, 211$c$, 211$d$, . . . , 211$m$ may include information about the application of the electronic device 101, as the information about the state of the electronic device 101 including the user (or the electronic device 101). For example, the processor 120 may identify the information about the application based on the information about the download (or installation) and/or execution of the application, but the identification method thereof is not limited.

For example, the processor 120 may manage at least one piece of context information 211$a$, 211$b$, 211$c$, 211$d$, . . . , 211$m$ for each item. For example, when identifying that new information is generated, the processor 120 may classify and manage the generated new information for each item. The processor 120 may store the new information in place of the existing information and/or together with the existing information, but the management method thereof is not limited. For example, the information about the current time and the place where the electronic device 101 is positioned may replace the existing information. For example, the information about the user's schedule may be stored in addition to the existing information.

Referring back to FIG. 2A, the processor 120 may identify information 221$a$, 221$b$, 221$c$, 221$d$, . . . , 221$n$ about at least one node of the first knowledge graph 191$a$. A knowledge graph may be a data structure including at least one node and at least one edge, and the structure of the knowledge graph is described in more detail with reference to FIG. 2C. The knowledge graph may be a data structure defining a relationship between at least one entity, the at least one entity may be referred to as a node, and the relationship between the entities may be referred to as an edge. It will be understood by one of ordinary skill in the art that a data structure representing a relationship between entities may be used in addition to a knowledge graph and/or in place of the knowledge graph. It will be understood by one of ordinary skill in the art that, according to the data structure, the node may also be referred to by another name (e.g., an entity), and the edge may also be referred to by another name (e.g., relationship information). The processor 120 may collect various types of information, and may generate the knowledge graphs 191$a$, 191$b$, . . . , 191$l$ and store them in the memory 130 by identifying at least one node and edge based on the collected information. Meanwhile, the generation of the knowledge graph by the electronic device 101 is merely exemplary, and it will be understood by one of ordinary skill in the art that the electronic device 101 may receive at least some of the knowledge graphs 191$a$, 191$b$, . . . , 191$l$ from an external device (which may be, e.g., a server, but is not limited) and store the same, and there is no limitation on the subject of generating the knowledge graphs.

In the embodiment of FIG. 2A, it is illustrated that the processor 120 compares the information 221$a$, 221$b$, 221$c$, 221$d$, . . . , 221$n$ about at least one node of the first knowledge graph 191$a$ among the at least one knowledge graph 191$a$, 191$b$, and 191$c$ with at least one piece of context information 211$a$, 211$b$, 211$c$, 211$d$, . . . , 211$m$, but this is exemplary. As described below in more detail, the processor 120 may compare the at least one piece of context information 211$a$, 211$b$, 211$c$, 211$d$, . . . , 211$m$ with another knowledge graph 191$b$, . . . , 191$l$, and may select any one knowledge graph based on a plurality of comparison results.

In one example, the processor 120 may compare context information and node information for each item. For example, the first context information 211$a$ may correspond to a first item (e.g., the current time), and the first node information 221$a$ may correspond to the first item. Further, the second context information 211$b$ may correspond to a second item (e.g., the current place), and the second node information 221$b$ may correspond to the second item. The processor 120 may compare the first context information 211$a$ corresponding to the first item (e.g., the current time) with the first node information 221$a$ corresponding to the first item (e.g., the current time). The processor 120 may identify whether the first context information 211$a$ corresponding to the first item (e.g., the current time) corresponds to the first node information 221$a$ corresponding to the first item (e.g., the current time). For example, when at least part of the text of the first context information 211$a$ corresponding to the first item (e.g., the current time) and at least part of the first node information 221$a$ corresponding to the first item (e.g., the current time) are the same (or same for at least N or more), the processor 120 may identify that the first context information 211$a$ corresponds to the first node information 221$a$. For example, when the meaning of the first context information 211$a$ corresponding to the first item (e.g., the current time) is the same as or similar to the meaning of at least part of the first node information 221$a$ corresponding to the first item (e.g., the current time), the processor 120 may identify that the first context information 211$a$ corresponds to the first node information 221$a$, but this is exemplary and there is no limitation on the condition of determining whether to correspond. One or more pieces of context information may correspond to any one item, and one or more pieces of node information may correspond to any one item. Accordingly, it will be understood by one of ordinary skill in the art that the ratio of the context information and the node information to be compared for any item may be one to one, one to many, many to one, etc. In one example, the processor 120 may not manage context information and node information for each item. In this case, the processor 120 may compare, e.g., the first context information 211a with all or some of the node information 221a, 221b, 221c, 221d, . . . , 221n of the first knowledge graph 191a to be identified. The processor 120 may identify whether at least some of all the node information 221a, 221b, 221c, 221d, . . . , 221n of the first knowledge graph 191a correspond to the first context information 211a. The comparison result may include node information corresponding to at least some of the at least one context 211a, 211b, 211c, 211d, . . . , 211m of the identification target and/or a score identified based on a correspondence relationship. As described above, the processor 120 may perform comparison with at least some of the other knowledge graphs 191b, . . . , 191l as well as the first knowledge graph 191a as illustrated in FIG. 2A. The processor 120 may finally identify a knowledge graph used to generate the reference text 230 based on scores respectively corresponding to the knowledge graphs, which is described below in more detail.

The processor 120 may identify (e.g., generate) the reference text 230 based on the comparison result. In an example, the processor 120 may identify the reference text 230 based on node information corresponding to at least some of the at least one context 211a, 211b, 211c, 211d, . . . , 211m of the identification target. The reference text 230 may be text included in the search box based on the occurrence of a trigger for representing the search box. When part of the reference text 230 is the same as, e.g., the text input by the user, the corresponding part may be expressed to have different attributes from the remaining part, but this is exemplary. If the text input by the user is different from part of the reference text 230, the expression of the reference text 230 may be stopped, and the text input by the user may be expressed. The reference text 230 may be referred to as, e.g., a placeholder, a guide phrase, or a temporary phrase, but is not limited thereto. For example, it is assumed that the first node information 221a and the second node information 221b correspond to the context information 211a, 211b, 211c, 221d, . . . , 221m. The processor 120 may identify (or generate) the reference text 230 including at least part of the first node information 221a and at least part of the second node information 221b.

In one example, the processor 120 may identify (or generate) the reference text 230 by additionally and/or alternatively using node information associated with node information corresponding to at least some of the at least one context 211a, 211b, 211c, 211d, . . . , 211m of the identification target. For example, it is assumed that the first node information 221a and the second node information 221b correspond to the context information 211a, 211b, 211c, 221d, . . . , 221m, and the second node information 221b is associated with the third node information 221c on the first knowledge graph 191a. The processor 120 may identify (or generate) the reference text 230 by additionally and/or alternatively using at least part of the third node information 221c to at least part of the first node information 221a and at least part of the second node information 221b.

In one example, the processor 120 may identify (or generate) the reference text 230 by additionally and/or alternatively using additional information to node information corresponding to at least some of the at least one context 211a, 211b, 211c, 211d, . . . , 211m of the identification target. For example, the additional information may be information used to complete an interactive phrase. For example, the additional information may be determined based on the identified node information and/or may be determined independently from the identified node information. For example, it is assumed that the identified node information is "mom", "return home", and "2023 Aug. 30, 14:00". The processor 120 may replace the node information of "2023 Aug. 30, 14:00" corresponding to the item "time" with the additional information "when?" corresponding to the node information of time, and may accordingly identify the reference text 230 such as "When is mom returning home?" Alternatively, when the identified node information is "mom" and "return home", the processor 120 may identify the reference text 230 such as "Where is mom returning home?" using the additional information "where?" which is irrelevant to the identified node information. The additional information may be identified based on, e.g., a designated rule. For example, to replace the text associated with the place, the additional text may be identified based on a rule in which the text "where" is used. Alternatively, the additional information may be identified based on an artificial intelligence model. For example, a large-scale language model may be requested to generate an inquiry-type phrase based on the text "mom", "return home", and "2023 Aug. 30", and the large-scale language model may provide the reference text "When is mom returning home?" as an answer.

Figure 2B:
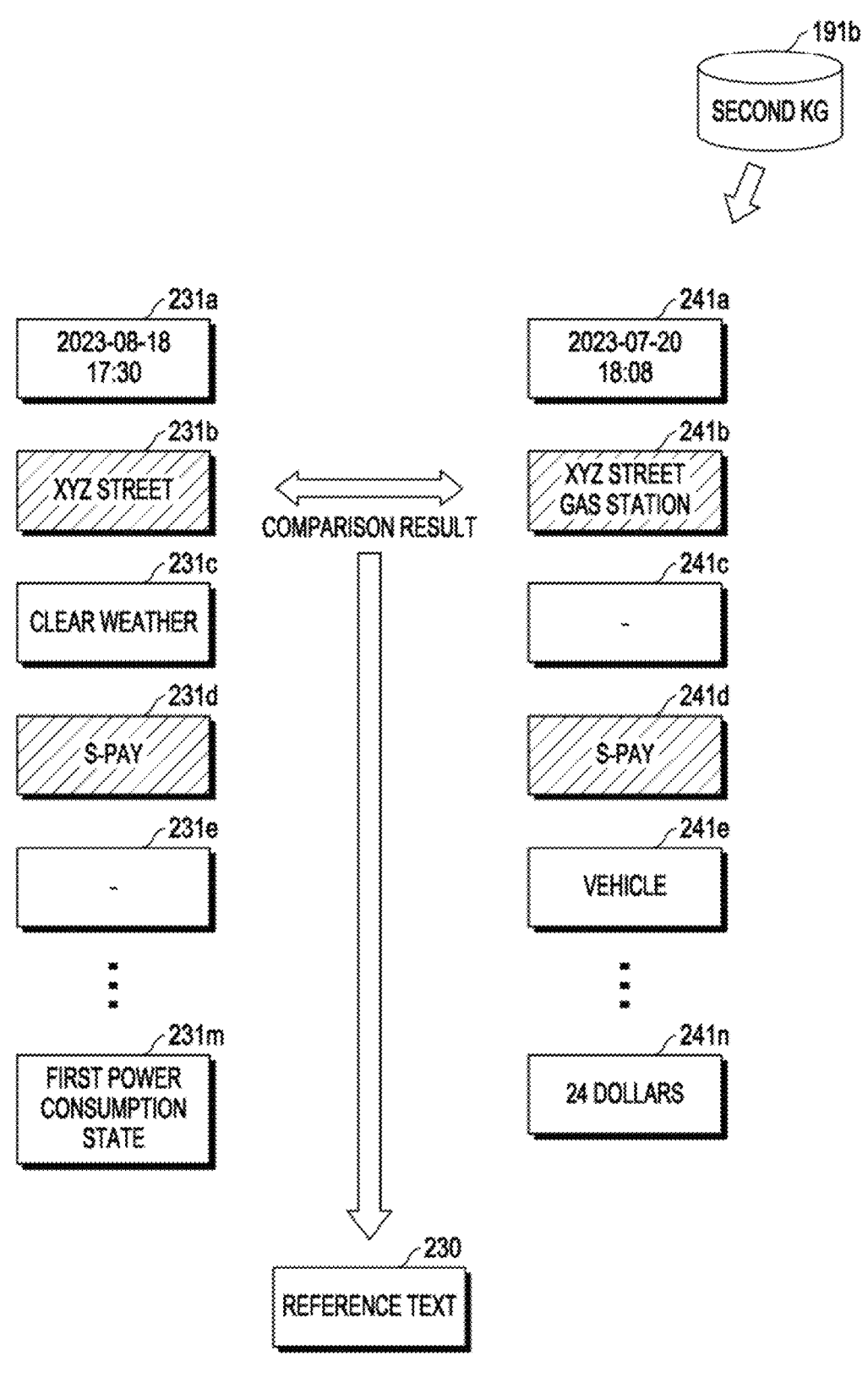
FIG. 2B is a view illustrating providing a reference text based on user context information and a knowledge graph according to an embodiment.
Figure 2C:
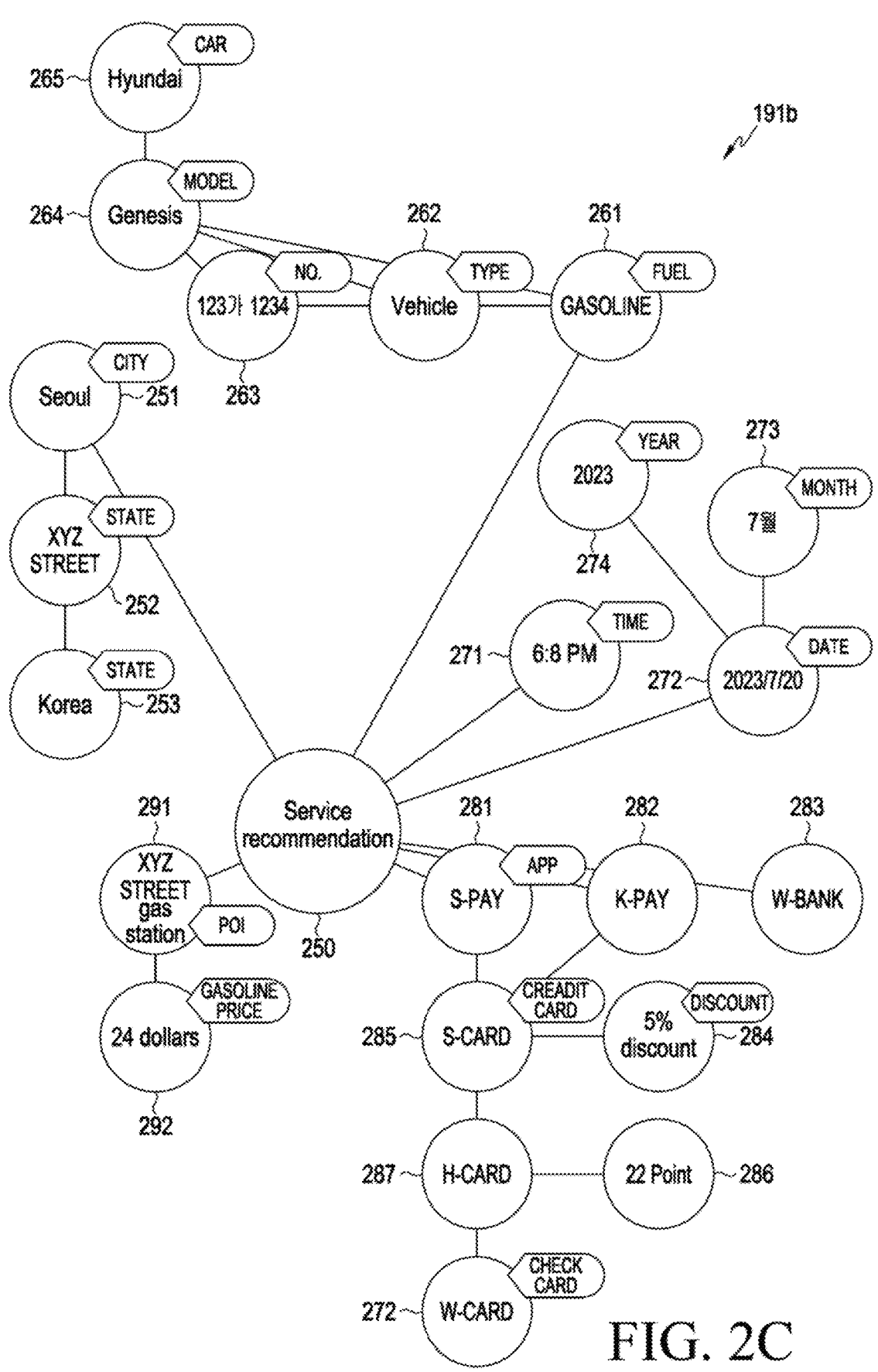
FIG. 2C is a view illustrating a knowledge graph according to an embodiment.

FIG. 2B is a view illustrating providing a reference text based on user context information and a knowledge graph. The embodiment of FIG. 2B is described with reference to FIG. 2C. FIG. 2C is a view illustrating a knowledge graph, according to an embodiment.

According to an embodiment, the processor 120 may include at least one piece of context information 231a, 231b, 231c, 231d, and 231m. The method for identifying the at least one piece of context information 231a, 231b, 231c, 231d, and 231m has been described above with reference to FIG. 2A, and thus is not repeated here. The context information 231a may include information about the current time. The context information 231b may include information about the current place. The context information 231c may include information about the current weather. The context information 231d may include information about the installed application. The content information 231m may include information about the power consumption state of the electronic device 101.

The processor 120 may include information 221a, 221b, 221c, 221d, and 221n about at least one node corresponding to the second knowledge graph 191b. For example, the structure of the second knowledge graph 191b may be as shown in FIG. 2C. The second knowledge graph 191b may include a center node 250, and the center node 250 may be a result of analyzing the meaning of nodes of the second knowledge graph 191b, but is not limited thereto. The second knowledge graph 191b may include nodes 251, 252, and 253 associated with a place. The second knowledge graph 191b may include nodes 261, 262, 263, 264, 265, and 266 associated with a boarding means. The second knowledge graph 191b may include nodes 271, 272, 273, and 274 associated with the date and/or time. The second knowledge graph 191b may include nodes 281, 282, 283, 284, 285, 286, 287, and 288 associated with finance-related information. The second knowledge graph 191b may include nodes 291 and 292 associated with a payment result. As shown in FIG. 2C, the second knowledge graph 191b may be constructed so that nodes having the same (or similar) attribute are associated with each other. For example, the node information 241*a* of FIG. 2B may be time information based on the nodes 271 and 272 of FIG. 2C. The node information 241*a* may be generated or identified, e.g., based on a single node or a plurality of nodes on a knowledge graph. The node information 241*b* of FIG. 2B may be information related to payment based on the node 291 of FIG. 2C. It may be identified that the second knowledge graph 191*b* of FIG. 2C does not include information related to weather, and accordingly, the second knowledge graph 191*b* is illustrated as not including node information corresponding to the item 241*c* of weather. The node information 241*d* of FIG. 2B may be information related to finance based on the node 281 of FIG. 2C. The node information 241*e* of FIG. 2B may be information related to a boarding means based on the node 262 of FIG. 2C. The node information 241*n* of FIG. 2B may be information related to payment based on the node 292 of FIG. 2C. For example, information about all the nodes of the second knowledge graph 191*b* of FIG. 2C may be used for comparison, or information about some nodes may be used for comparison.

For example, as described above, the processor 120 may compare the context information and the information about the node for each item, or compare the context information and the information about the node without a specific criterion. For example, the processor 120 may compare the context information 231*a* for the current time with the information 241*a* for the node associated with the time which is the same (or similar) item. For example, the processor 120 may identify that the two pieces of information 231*a* and 241 correspond to each other, based on a time difference between the two pieces of information 231*a* and 241*a* being less than or equal to a threshold time difference. When the time difference between both the pieces of information 231*a* and 241*a* exceeds the threshold time difference, the processor 120 may identify that both the pieces of information 231*a* and 241 do not correspond to each other. In the example of FIG. 2B, it may be identified that the time difference between both the pieces of information 231*a* and 241 exceeds a threshold time (e.g., one day) difference, and the processor 120 may identify that both the pieces of information 231*a* and 241 do not correspond to each other.

For example, the processor 120 may compare the context information 231*b* for the current place with the information 241*b* for the node associated with the place which is the same (or similar) item. For example, when both the pieces of information 231*b* and 241*b* are the same or similar, the processor 120 may identify that both the pieces of information 231*a* and 241 correspond to each other. The condition for determining similarity may be set based on, e.g., the number of common texts, the ratio of the common texts to all the texts, the meaning of places, and/or the inclusion relationship between places, but the condition is not limited thereto. For example, in the example of FIG. 2B, "XYZ STREET" of the context information 231*b* may be compared with "XYZ STREET GAS STATION" of the node information 241*b*. It may be identified that both the pieces of information 231*b* and 241*b* correspond to each other based on the number of "XYZ STREET"s which are the common texts of both the pieces of information 231*b* and 241*b* and/or the ratio to all the texts (e.g., XYZ STREET), but this is exemplary and there is no limitation on the method for identifying whether both the pieces of information correspond to each other.

For example, the processor 120 may identify that the context information 231*c* about the current weather does not correspond to the information 241*a*, 241*b*, 241*d*, 241*e*, and 241*n* about the at least one node.

For example, the processor 120 may compare the context information 231*d* for the application with the information 241*d* for the node associated with the payment application which is the same (or similar) item. For example, when both the pieces of information 231*d* and 241*d* are the same or similar, the processor 120 may identify that both the pieces of information 231*d* and 241*d* correspond to each other. The condition for determining similarity may be set based on, e.g., the number of common texts, the ratio of the common texts to all the texts, the meaning of applications, and/or whether the attributes of the applications are the same or similar, but the condition is not limited thereto. For example, in the example of FIG. 2B, "S-PAY" of the context information 231*d* may be compared with "S-PAY" of the node information 241*d*. It may be identified that both the pieces of information 231*d* and 241*d* correspond to each other based on the number of "S-PAY"s, which are the common texts of both the pieces of information 231*d* and 241*d*, and/or the ratio to all the texts (e.g., S-PAY), but this is exemplary and there is no limitation on the method for identifying whether both the pieces of information 231*d* and 241*d* correspond to each other.

For example, the processor 120 may identify that the information 241*e* about the node associated with the boarding means does not correspond to the at least one piece of context information 231*a*, 231*b*, 231*c*, 231*d*, and 231*m*. For example, the processor 120 may identify that the context information 231*m* about the current power consumption state does not correspond to the information 241*a*, 241*b*, 241*d*, 241*e*, and 241*n* about the at least one node. For example, the processor 120 may identify that the information 241*n* about the node associated with the payment does not correspond to the at least one piece of context information 231*a*, 231*b*, 231*c*, 231*d*, and 231*m*.

For example, the processor 120 may generate the reference text 230 based on the comparison result. The comparison result may include, e.g., that the context information 231*b* corresponds to the information 241*b* about the node, and that the context information 231*d* corresponds to the information 241*d* about the node. Meanwhile, the comparison result may include a score calculated according to whether the context information and the information about the node correspond to each other, which may be used for comparison with a score corresponding to another knowledge graph, which is described below in more detail. For example, the processor 120 may generate the reference text 230 based on both the pieces of information 241*b* and 241*d* about the node identified to correspond to both the pieces of context information 231*b* and 231*d*. In one example, the processor 120 may generate the reference text 230 including the text of both the pieces of information 241*b* and 241*d* about the node. In the example of FIG. 2B, e.g., "XYZ STREET GAS STATION, S-PAY" in which "XYZ STREET GAS STATION" of the node information 241*b* and "S-PAY" of the node information 241D are combined may be generated as the reference text 230. In another example, the processor 120 may generate the reference text 230 by using the information about the node associated with the corresponding node additionally and/or alternatively to the text of the information 241*b* and 241*d* about the nodes. For example, nodes 284, and 285 may be associated, as edges, with the node 281 on the second knowledge graph 191*b* of FIG. 2C corresponding to the information 241*d* about the node. The processor 120 may additionally and/or alternatively use, e.g., text for "5% discount", which is information corresponding to the node 284. Meanwhile, when there are a plurality of node information corresponding to the discount rate, the processor 120 may select the node information having the highest discount rate. Accordingly, the processor 120 may generate the reference text 230 of "XYZ STREET GAS STATION, S-PAY, 5% discount", or may generate the reference text 230 such as "S-PAY, 5% discount". In another example, the processor 120 may generate the reference text 230 by additionally and/or alternatively using additional text independent from the knowledge graph. For example, the processor 120 may use additional text for completing an interactive sentence. For example, a reference text 230 including an additional text of "TRY" may be generated, such as "XYZ STREET GAS STATION, TRY S-PAY." For example, since "S-PAY" is used as an object, the verb "TRY" may be added. Alternatively, the processor 120 may generate the reference text 230 such as "XYZ STREET, HOW CAN I GET DISCOUNT?" by including an additional text such as "HOW CAN I GET DISCOUNT?" in place of "S-PAY" in that "S-PAY" is an object for discounting. For example, the processor 120 may use at least one additional text based on at least part of 5W1H ("who", "when", "where", "what", "why", "how"). For example, it is assumed that the processor 120 identifies "mom" and "return home" as node information. The processor 120 may identify that the text corresponding to [WHO] is "mom" and the text corresponding to [WHAT] is "return home". Meanwhile, when at least one other node of the knowledge graph is associated with "time" (or "schedule"), the processor 120 may generate a reference text "when is mom returning home?" using an additional text "when?" corresponding to [WHEN]. When at least one other node of the knowledge graph is associated with a "place", the processor 120 may generate a reference text "where is mom returning home?" using an additional text "where?" corresponding to [WHERE].

Figures 3A, 3B:
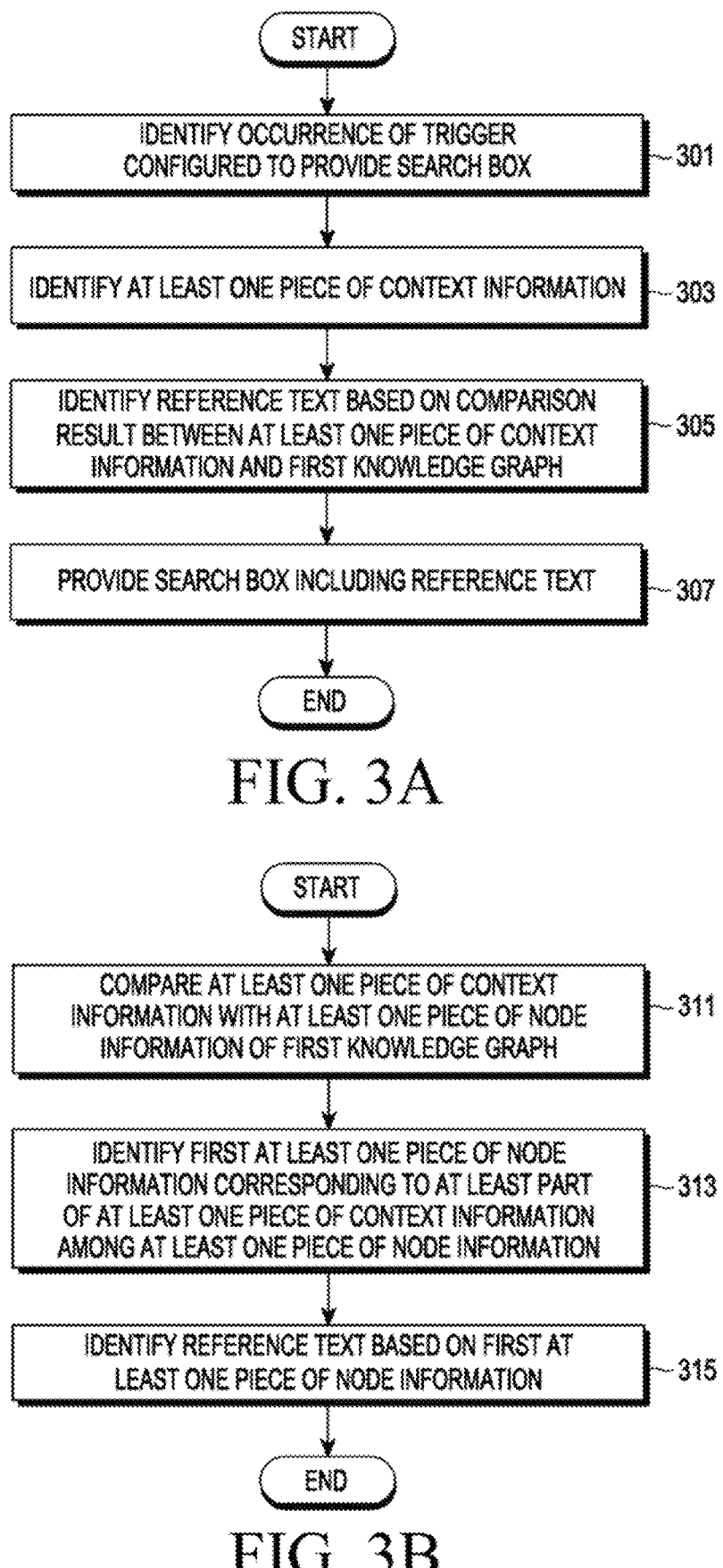
FIG. 3A is a flowchart illustrating a method for providing a search box including a reference text according to an embodiment.
FIG. 3B is a flowchart illustrating a method for identifying a reference text according to an embodiment.

FIG. 3A is a flowchart illustrating a method for providing a search box including a reference text, according to an embodiment;

According to an embodiment, in operation 301, the electronic device 101 may identify the occurrence of a trigger configured to provide a search box. For example, when a touch input to the search box is made, a soft input panel (SIP) may be represented together with the search box, and a text corresponding to the user input through the SIP may be provided to the search box. Meanwhile, the input through the SIP is merely exemplary, and it will be understood by one of ordinary skill in the art that the text corresponding to the user voice may be expressed in the search box. The electronic device 101 may be configured to provide an object (which may be expressed as an icon, text, image, visual element, visual component, avatar, thumbnail, pop-up, animation, key, and/or button, but the expression method thereof is not limited) corresponding to at least one function and/or at least one application corresponding to the text provided in the search box. For example, the object may be set to enable execution of the corresponding function and/or application when designated, but is not limited thereto. Alternatively, the electronic device 101 may be configured to execute at least one function and/or at least one application corresponding to the text provided in the search box. For example, the trigger configured to provide the search box may be a drag (or swipe) gesture input in a first direction (which may be, e.g., an upward direction but is not limited) in a launcher application, but is not limited thereto. The trigger may be a touch-based gesture or may be implemented based on user voice analysis, but the implementation method thereof is not limited.

In operation 303, the electronic device 101 may identify at least one piece of context information. For example, the identification of the at least one piece of content information is illustrated as being performed after the identification of the occurrence of the trigger for providing the search box in operation 301, but this is merely an example and may be performed before the identification of the occurrence of the trigger for providing the search box. According to various embodiments of the disclosure including the present embodiment, the order in which the two operations performed by the electronic device 101 are performed is not limited, and those skilled in the art will understand that at least one operation may be additionally performed between the two operations. It will be understood by those skilled in the art that some of the plurality of operations in various embodiments of the disclosure including the present embodiment may be omitted. At least one piece of context information may be identified based on trigger occurrence, or may be identified regardless of trigger occurrence. For example, at least one piece of context information may be updated and managed for each item as described above, but this is exemplary and the management method is not limited thereto.

In operation 305, the electronic device 101 may identify the reference text, based on a comparison result between at least some of the at least one piece of context information and at least some of the at least one piece of node information included in the first knowledge graph. Although the identification of the reference text based on the comparison result in operation 305 is also illustrated as being performed after performing operations 301 and 303, this is exemplary, and it will be understood by one of ordinary skill in the art that the reference text based on the comparison result may be identified before performing operation 301 and/or 303. Further, the identification of the reference text based on the comparison result of operation 305 may be performed based on the execution of operation 301 and/or operation 303. Alternatively, the identification of the reference text may be performed irrespective of the execution of operation 301. For example, it will be understood by one of ordinary skill in the art that the reference text may be identified in real time based on the comparison result between the current context information and then, the first knowledge graph even before the trigger occurs, and the reference text identified in real time based on the trigger occurrence may be immediately provided. Accordingly, if a trigger occurs, the electronic device 101 may immediately provide the previously identified reference text. Alternatively, it will be understood by one of ordinary skill in the art that the electronic device 101 may provide a reference text as a hint regardless of the occurrence of the trigger. The detailed process of identifying the reference text based on the comparison result between at least some of the at least one piece of context information and at least some of the at least one piece of node information included in the first knowledge graph has been described above with reference to FIGS. 2A to 2C, and thus the description thereof is not repeated. In operation 307, the electronic device 101 may provide, through the display 160, a search box including the reference text identified in operation 305, corresponding to identification of the occurrence of the trigger. The user may identify what text may be input to the search box by identifying the reference text included in the search box.

The provision of the search box including the reference text through the display 160 is merely exemplary, and those skilled in the art will understand that the electronic device 101 may provide a voice response corresponding to the reference text generated based on a text to speech (TTS) result. In this case, the electronic device 101 may provide a voice response corresponding to the reference text based on a voice question and answer method rather than on a search box basis. For example, the electronic device 101 may identify an inquiry for providing a reference text from the user, e.g., a voice command for providing a reference text such as "What is important now?" or "What can I do now?" The electronic device 101 may be configured to provide a voice response corresponding to the reference text in response to the corresponding voice command.

Alternatively, the electronic device 101 may provide the reference text in an area other than the inside of the search box. For example, the electronic device 101 may provide a search box, and may provide a reference text in an area different from the search box. Alternatively, the electronic device 101 may provide only the reference text without the search box. For example, the electronic device 101 may provide the reference text without the search box, or may provide at least one object associated with the reference text together with the reference text, based on the occurrence of a trigger configured to provide the reference text. The at least one object associated with the reference text may be, e.g., information associated with the function and/or the application for configuring the node corresponding to the context information, which is described below in more detail.

FIG. 3B is a flowchart illustrating a method for identifying a reference text according to an embodiment.

According to an embodiment, in operation 311, the electronic device 101 may compare at least one piece of context information with at least one piece of information about the first knowledge graph. In operation 313, the electronic device 101 may identify first at least one node information corresponding to at least some of at least one piece of context information among the at least one piece of node information. For example, as described above with reference to FIG. 2B, the node information 241b and 241d corresponding to the context information 231b and 231d may be identified as the first at least one piece of node information, and since the determination of whether they correspond has been described above, the description is not repeated below. In operation 315, the electronic device 101 may identify the reference text based on the first at least one piece of node information. For example, the electronic device 101 may identify a reference text of "XYZ STREET GAS STATION, S-PAY" based on "XYZ STREET GAS STATION" and "S-PAY" which are node information 241b and 24d. In this case, the reference text may be generated by combining "XYZ STREET GAS STATION" and "S-PAY" which are the node information 241b and 241d. For example, the reference text may be generated by in such a manner that part of "XYZ STREET GAS STATION" and "S-PAY" which are the node information 241b and 241d is omitted. For example, the electronic device 101 may generate a reference text by further adding additional text to at least part of "XYZ STREET GAS STATION" and "S-PAY" which are the node information 241b and 241d. For example, the electronic device 101 may generate a reference text using an additional text such as "USE" in "XYZ STREET GAS STATION, USE S-PAY". Alternatively, the electronic device 101 may generate a reference text using an additional text of "WHAT CAN I USE" replacing "S-PAY" in "XYZ STREET GAS STATION, WHAT CAN I USE?".

Figure 3C:
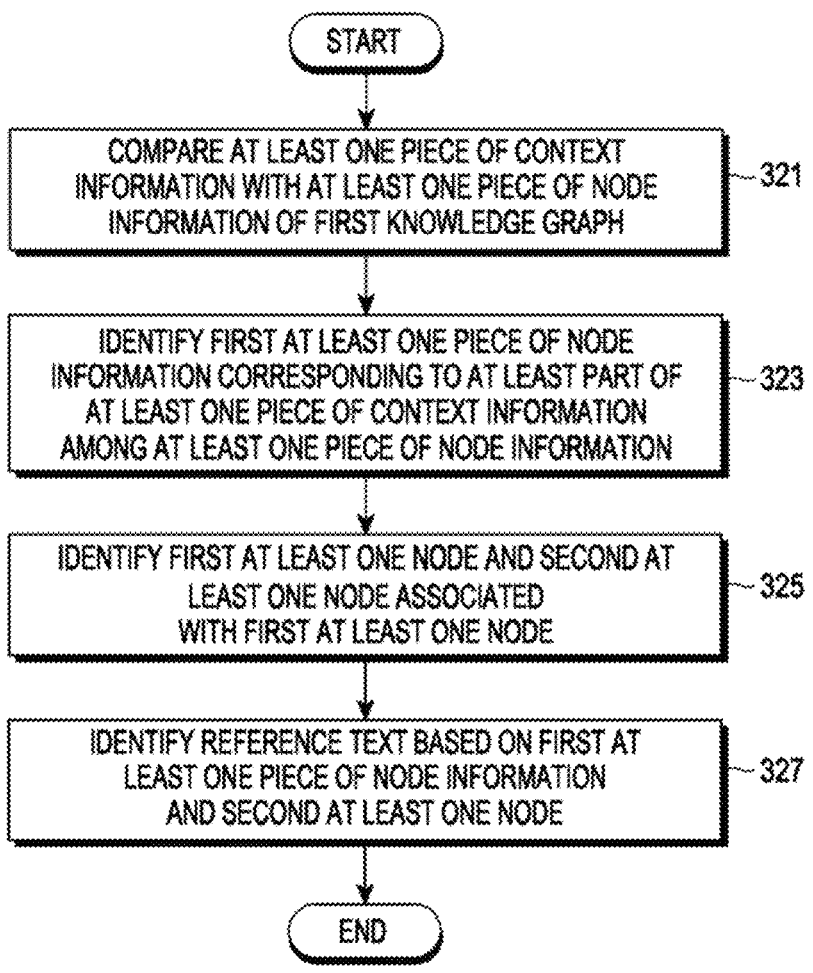
FIG. 3C is a flowchart illustrating a method for identifying a reference text according to an embodiment.

FIG. 3C is a flowchart illustrating a method for identifying a reference text according to an embodiment.

According to an embodiment, in operation 321, the electronic device 101 may compare at least one piece of context information with at least one piece of information about the first knowledge graph. In operation 323, the electronic device 101 may identify first at least one node information corresponding to at least some of at least one piece of context information among the at least one piece of node information. For example, as described above with reference to FIG. 2B, the node information 241b and 241d corresponding to the context information 231b and 231d may be identified as the first at least one piece of node information, and since the determination of whether they correspond has been described above, the description is not repeated below. In operation 325, the electronic device 101 may identify the first at least one node and second at least one node associated with the first at least one node directly or through association with another node. For example, the electronic device 101 may identify "5% DISCOUNT", which is node information corresponding to the node 284 associated with the nodes 281 and 291 of FIG. 2C corresponding to the node information 241b and 241d directly or through association with another node. For example, the electronic device 101 may identify at least one second node among the associated nodes based on the principle of 5W1H as described above, but the identification method thereof is not limited thereto. In operation 327, the electronic device 101 may identify the reference text based on the first at least one piece of node information and the second at least one piece of node information. For example, the electronic device 101 may identify a reference text of "XYZ STREET GAS STATION, S-PAY, 5% discount" based on "XYZ STREET GAS STATION", "S-PAY", and "5% DISCOUNT". In this case, the reference text may be generated by combining "XYZ STREET GAS STATION", "S-PAY", and "5% discount". For example, the reference text may be generated by omitting some of "XYZ STREET GAS STATION", "S-PAY", and "5% DISCOUNT". For example, the electronic device 101 may generate a reference text by further adding additional text to at least part of "XYZ STREET GAS STATION", "S-PAY", and "5% DISCOUNT". For example, the electronic device 101 may generate a reference text using an additional text such as "GET" and "BY" in "XYZ STREET GAS STATION, GET 5% DISCOUNT BY S-PAY". Alternatively, the electronic device 101 may generate a reference text using an additional text of "HOW CAN I GET DISCOUNT" replacing "S-PAY" and "5% DISCOUNT" in "XYZ STREET GAS STATION, HOW CAN I GET DISCOUNT?".

Figure 4A:
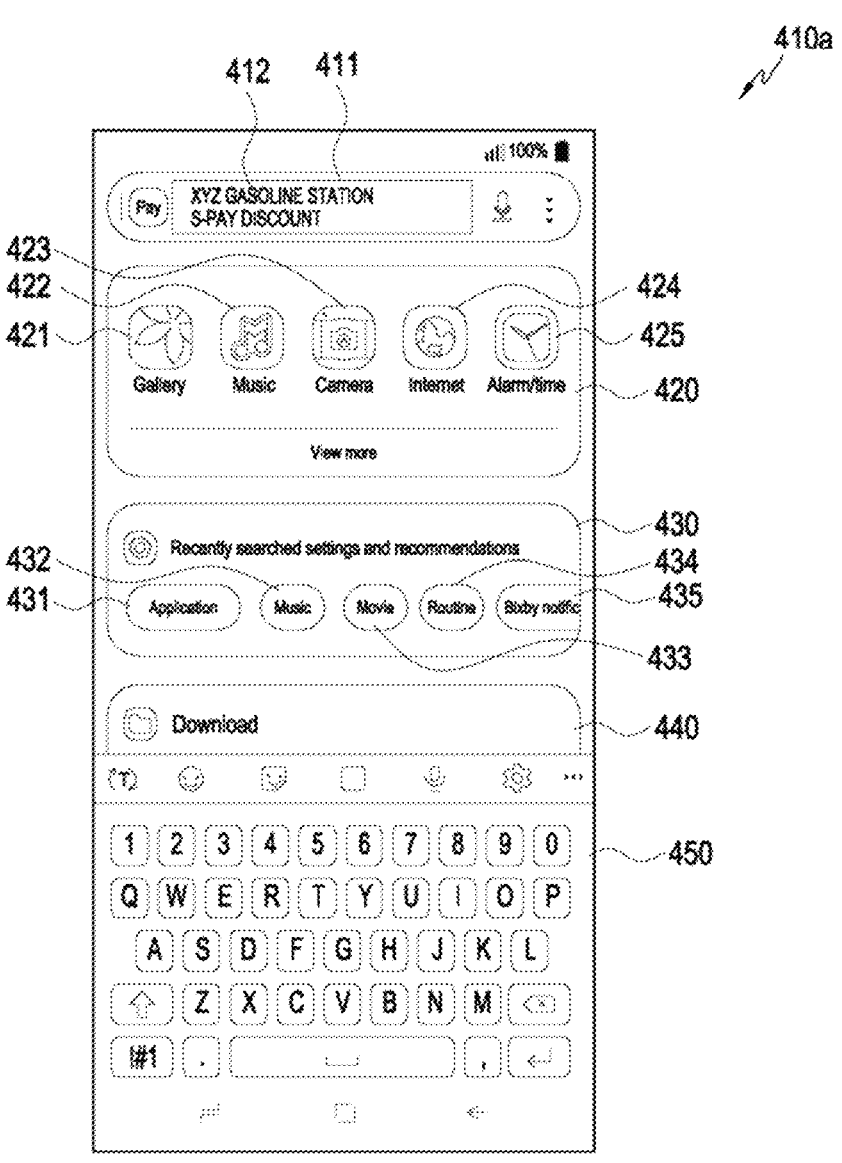
FIG. 4A is a view illustrating a reference text according to an embodiment.

FIG. 4A is a view illustrating a reference text according to an embodiment.

According to an embodiment, the electronic device 101 may provide a first screen 410a. For example, the electronic device 101 may control the display 160 to represent a first screen 410a, but this is merely an example, and the providing method is not limited thereto. The first screen 410a may include a search box 411. For example, the electronic device 101 may display a search box 411 based on detection of a trigger enabling provision of the search box 411, but is not limited thereto. The search box 411 may include a reference text 412. Since the generation of the reference text 412 has been described above, a detailed description thereof is not repeated. The reference text 412 may have, e.g., a first attribute. The attribute may include, e.g., color, thickness, transparency, and/or size, but the type and/or number is not limited. As the reference text 412 is provided, the user may recognize information about what search is possible. Further, as the reference text 412 is generated based on the context information, the reference text 412 appropriate for the current situation may be dynamically provided. For example, as described above, the electronic device 101 may provide a reference text 412 such as "XYZ GASOLINE STATION S-PAY DISCOUNT" based on context information about the "current place", and accordingly, the user may be recommended for a service optimized for the "current place" which is the current situation. Meanwhile, an object corresponding to an application associated with the reference text may be provided inside or near the search box 411, but is not limited thereto.

The electronic device 101 may provide at least one object 421, 422, 423, 424, and 425 corresponding to at least one application and an object 426 for calling an object corresponding to an additional application together with the search box 411, based on detection of a trigger enabling provision of the search box 411. The electronic device 101 may provide the box 430 for the search log through the search box 411, but is not limited thereto. The box 430 may include search words 431, 432, 433, 434, and 435. The electronic device 101 may provide a notification area 440, but is not limited thereto. The electronic device 101 may provide an SIP 450 for inputting a search word to the search box 411, but is not limited thereto. The user may input a desired search word by designating objects included in the SIP 450.

Figure 4B:
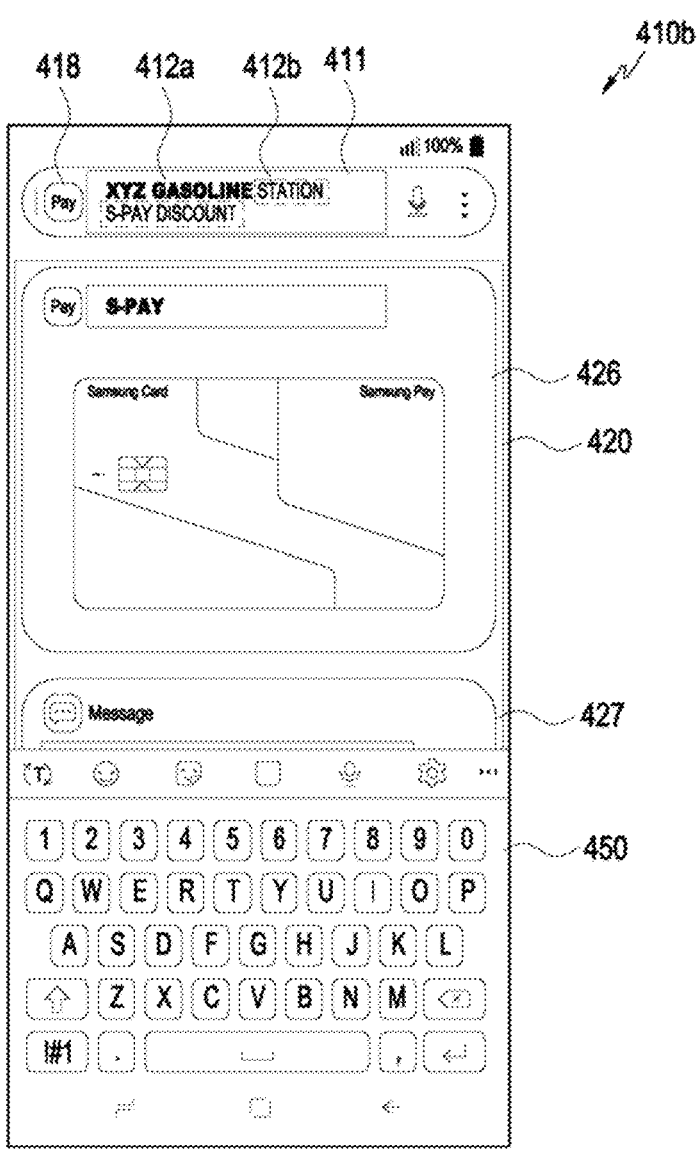
FIG. 4B is a view illustrating a reference text according to an embodiment.

FIG. 4B is a view illustrating a reference text according to an embodiment.

According to an embodiment, the electronic device 101 may provide a second screen 410b. For example, as the user selects at least some of at least one object included in the SIP 450, the user may input the text 412a. The electronic device 101 may provide the rest 412b of the reference text 412 and the input text 412a based on the input text 412a being the same as at least part of the reference text 412, which may be represented as maintaining the provision of the reference text 412. The text 412a input through the SIP 450 may have, e.g., a second attribute, and the second attribute may be different from the first attribute of the rest 412b of the reference text 412.

The electronic device 101 may provide at least one object 426 and 427 corresponding to at least one application and/or at least one function corresponding to the reference text 412. For example, the electronic device 101 may identify at least one application and/or at least one function corresponding to the reference text 412, based on the node used to identify the reference text 412. For example, the node information "XYZ distance", "S-PAY", and "5% discount" may be used to identify the reference text 412. The node information "S-PAY" may be generated, e.g., based on the use of the S-PAY application of the electronic device 101. "XYZ STREET" may be generated based on content included in a message based on, e.g., a message application. The electronic device 101 may provide an object 426 corresponding to the S-PAY application corresponding to the reference text 412 identified according to the above-described method and an object 427 corresponding to the message application. The object 427 corresponding to the message application may include at least part of the sender information 427a and the message content 427b, which are information associated with the message used to generate the corresponding node, but this is exemplary, and the disclosure is not limited thereto. When the object 426 corresponding to the S-PAY application or the object 427 corresponding to the message application is selected, the electronic device 101 may execute the corresponding application.

Figure 4C:
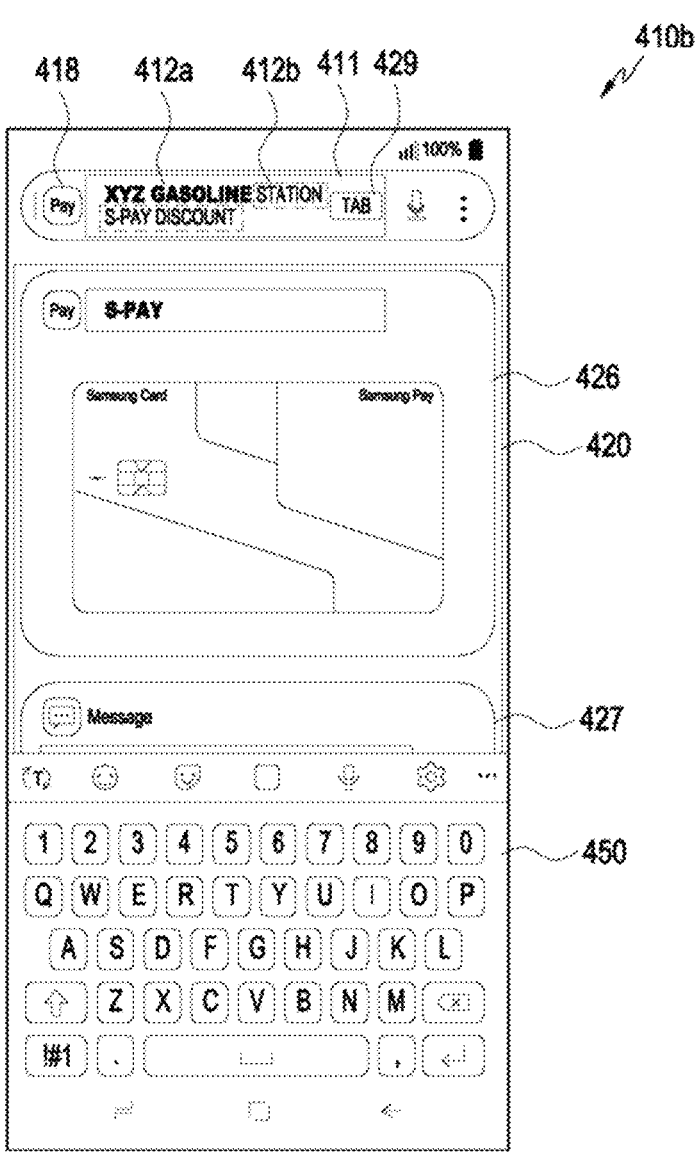
FIG. 4C and FIG. 4D are views illustrating a reference text according to an embodiment.
Figure 4D:
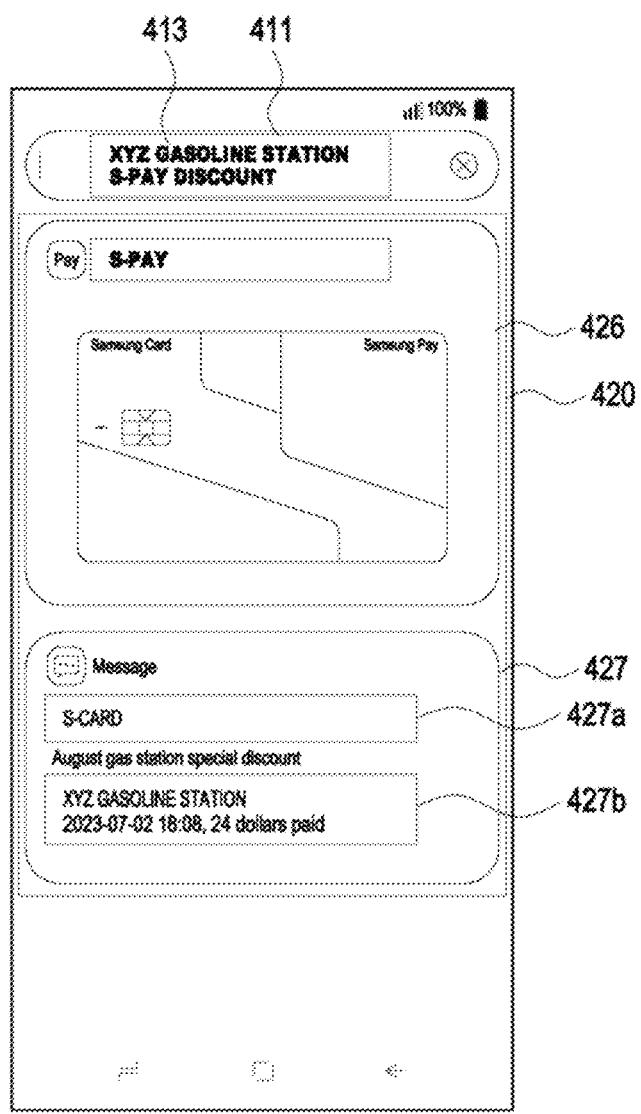

FIGS. 4C and 4D are views illustrating a reference text according to an embodiment.

Compared with FIG. 4B, in the embodiment of FIG. 4C, the electronic device 101 may further provide an object 429 for an autocomplete function. For example, when the text input by the user matches at least part of the reference text 412, the electronic device 101 may provide an object 429 for the autocomplete function. For example, when the number of common texts is larger than or equal to a designated threshold number, the electronic device 101 may provide the object 429 for the autocomplete function, but this is merely an example, and the trigger for providing the object 429 for the autocomplete function is not limited thereto. Alternatively, the electronic device 101 may be configured to automatically complete the reference text when the number of common texts is larger than or equal to a designated threshold number. When the object 429 for the autocomplete function is selected, the electronic device 101 may provide the entire text 413 corresponding to the reference text 412 as shown in FIG. 4D. The entire text 413 may have, e.g., a second attribute, but is not limited thereto.

In various embodiments, the electronic device 101 may be configured to change the reference text to another reference text. For example, the electronic device 101 may provide another reference text in replacement of the reference text, based on identifying that a reference text change input such as a swipe gesture occurs in the search box 411. The other reference text is described below. Alternatively, the electronic device 101 may provide a plurality of reference texts.

Figure 4E:
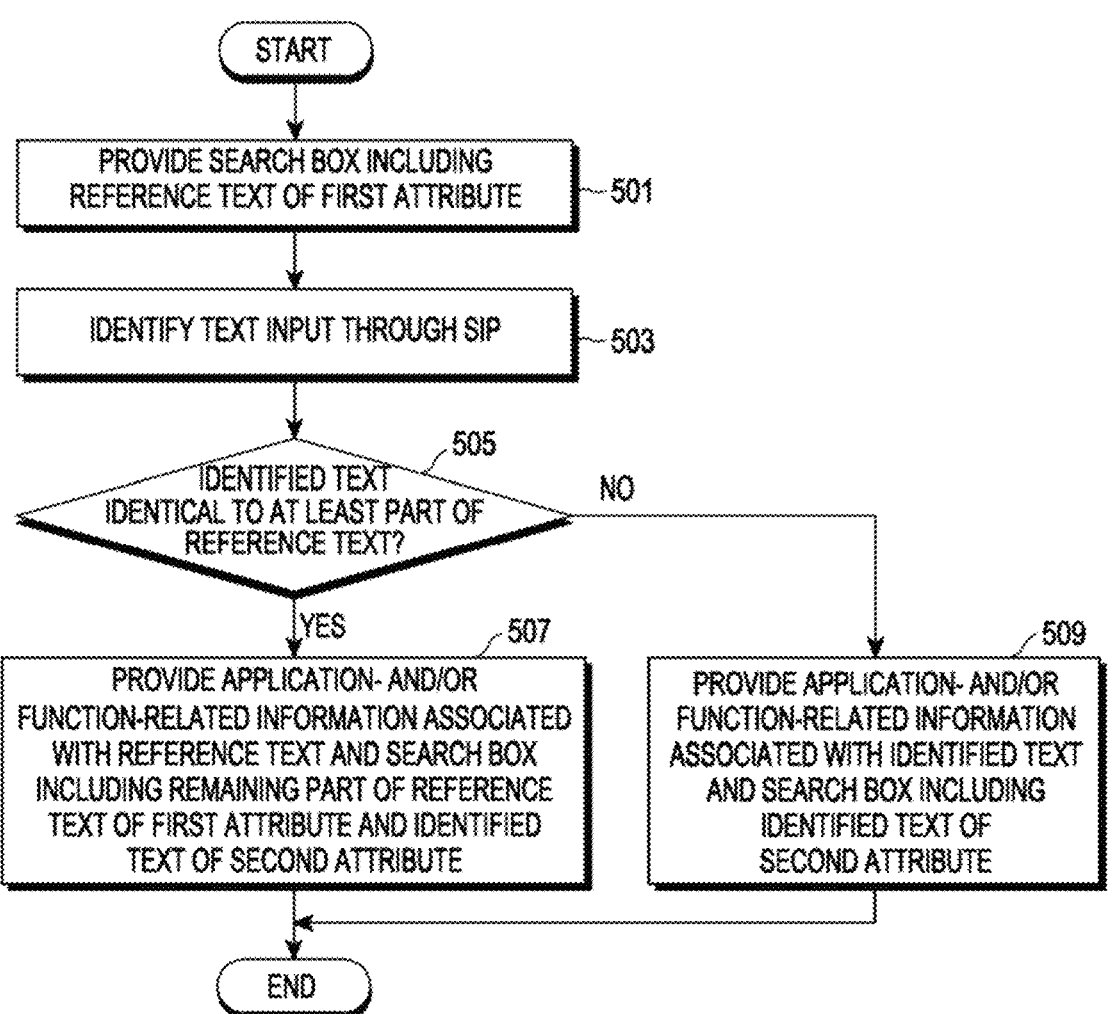
FIG. 4E is a flowchart illustrating a method for providing a reference text according to an embodiment.

FIG. 4E is a flowchart illustrating a method for providing a reference text according to an embodiment.

According to an embodiment, in operation 501, the electronic device 101 may provide a search box including a reference text having a first attribute. In operation 503, the electronic device 101 may identify the text input through the SIP. In operation 505, the electronic device 101 may identify whether the identified text is the same as at least part of the reference text. When the identified text is the same as at least part of the reference text (Yes in operation 505), the electronic device 101 may provide, in operation 507, a search box including the identified text of the second attribute and the remaining part of the reference text of the first attribute, and application and/or function-related information associated with the reference text.

For example, in the electronic device 101, as described with reference to FIG. 4B, the attribute of the identified text and the attribute of the remaining part of the reference text may be expressed differently. The application and/or function associated with the reference text may be identified based on, e.g., node information for generating the reference text, but the identification method thereof is not limited thereto. For example, when application and/or function-related information is selected, the electronic device 101 may execute the selected application and/or function. When the identified text is not the same as at least part of the reference text (No in operation 505), the electronic device 101 may provide a search box including the identified text having the second attribute and information about the application and/or the function associated with the identified text in operation 509. The electronic device 101 may be configured to stop providing the reference text and provide the identified text.

Figure 4F:
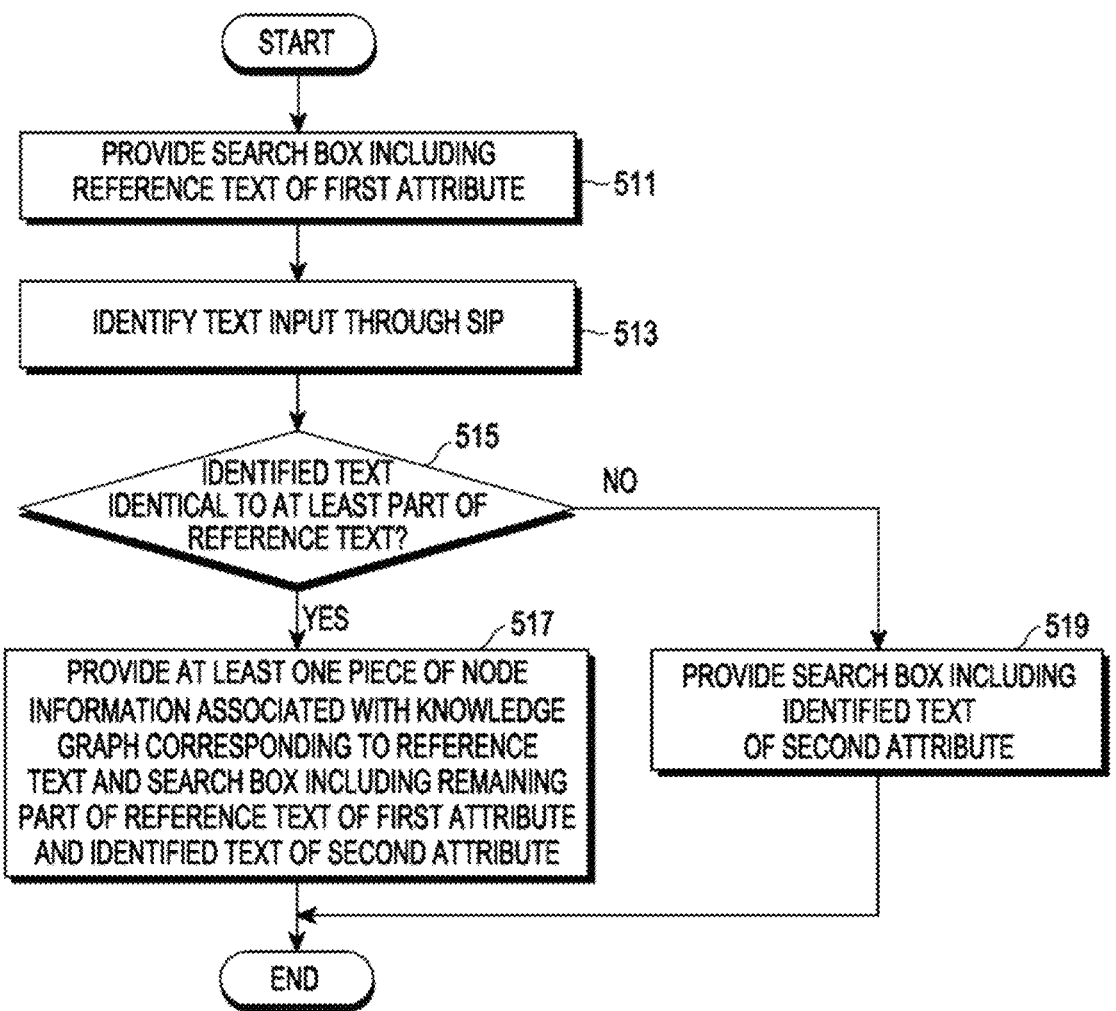
FIG. 4F is a flowchart illustrating a method for providing a reference text according to an embodiment.

FIG. 4F is a flowchart illustrating a method for providing a reference text according to an embodiment.

According to an embodiment, in operation 511, the electronic device 101 may provide a search box including a reference text having a first attribute. In operation 513, the electronic device 101 may identify the text input through the SIP. In operation 515, the electronic device 101 may identify whether the identified text is the same as at least part of the reference text. When the identified text is the same as at least part of the reference text (Yes in operation 515), the electronic device 101 may provide a search box including the identified text of the second attribute and the remaining part of the reference text of the first attribute and at least one piece of node information associated with the knowledge graph corresponding to the reference text in operation 517. For example, the electronic device 101 may provide information about the knowledge graph as shown in FIG. 2C, and the expression method thereof is not limited. When the identified text is not the same as at least part of the reference text (No in operation 515), the electronic device 101 may provide a search box including the identified text having the second attribute and information about the application and/or the function associated with the identified text in operation 519.

Figure 5A:
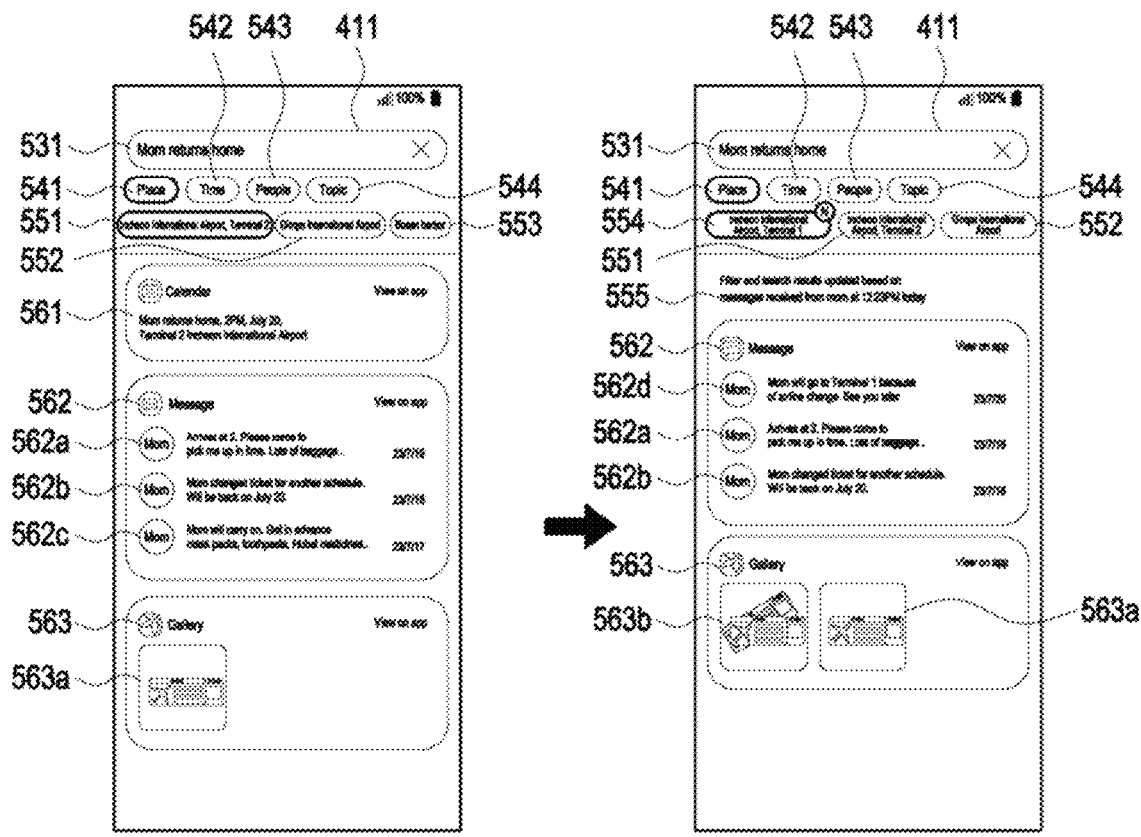
FIG. 5A illustrates an example of a screen provided by an electronic device according to an embodiment.

FIG. 5A illustrates an example of a screen provided by an electronic device according to an embodiment.

According to an embodiment, the electronic device 101 may provide a search box 411 including a text 531 corresponding to a user input. The electronic device 101 may provide items 541, 542, 543, and 544 for information associated with the text 531. The electronic device 101 may provide node information 551, 552, and 553 about any one of the items 541, 542, 543, and 544. In the example of FIG. 5A, based on selection of the place item 541, the electronic device 101 may provide node information 551, 552, and 553 corresponding to the place item 541. As described above, the electronic device 101 may provide information 561, 562, and 563 associated with the application and/or the function used to generate the node information 551, 552, and 553. For example, the electronic device 101 may provide information 561 associated with a calendar application, information 562 associated with a message application, and information 563 associated with a Gallery application. Message contents 562a, 562b, and 562c used to generate node information may be provided in the information 562 related to the message application. When the message contents 562a, 562b, and 562c are selected, the electronic device 101 may provide a message dialog window including the contents 562a, 562b, and 562c, i.e., the execution screen of the message application, but is not limited thereto. The information 563 related to the Gallery application may include a thumbnail 563a of an image used to generate node information. When the thumbnail 563a is selected, the electronic device 101 may provide an image corresponding to the thumbnail 563a, i.e., the execution screen of the Gallery application, but is not limited thereto.

Meanwhile, the electronic device 101 may receive a new message. The new message may include the content "Mom will go to terminal 1 because of airline change. See you later". The electronic device 101 may update the knowledge graph based on the new message. For example, the electronic device 101 may update the knowledge graph by adding or changing the "first terminal" included in the new message as node information of the corresponding knowledge graph. For example, the electronic device 101 may provide new node information 554 as node information corresponding to the reference text 531 of "mom returns home". The node information 554 may be expressed to indicate, e.g., that it is newly provided. The electronic device 101 may provide information 555 associated with update of node information. The information 562 related to the message application may include new message content 562d. The information 563 associated with the Gallery application may include a thumbnail 563b for an image included in a new message or transmitted together with the new message.

Figure 5B:
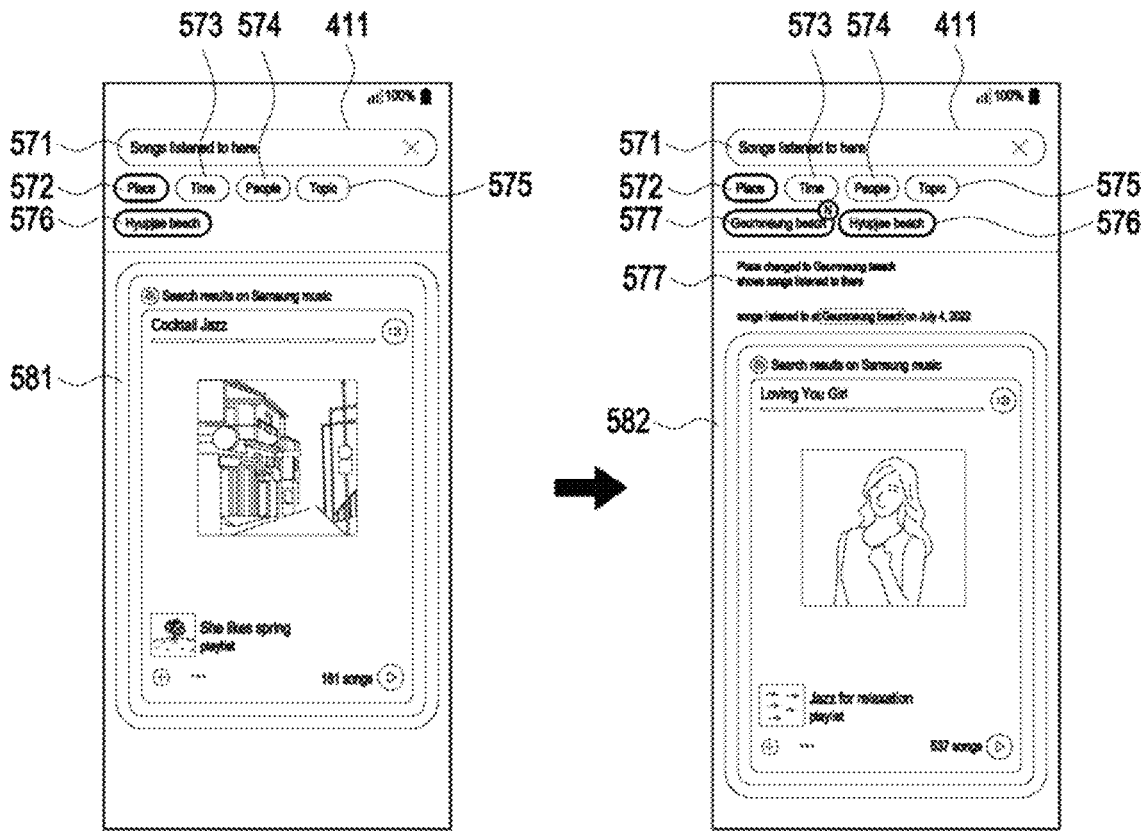
FIG. 5B illustrates an example of a screen provided by an electronic device according to an embodiment.

FIG. 5B illustrates an example of a screen provided by an electronic device according to an embodiment.

According to an embodiment, the electronic device 101 may provide a search box 411 including a text 571 (which may be, e.g., a text input by the user, but is not limited). The electronic device 101 may provide items 572, 573, 574, and 575 for information associated with the text 571. The electronic device 101 may provide node information 576 about any one of the items 572, 573, 574, and 575. In the example of FIG. 5B, based on selection of the place item 541, the electronic device 101 may provide node information 576 corresponding to the place item 572. As described above, the electronic device 101 may provide information 581 related to the application and/or the function used to generate the node information 576. For example, the electronic device 101 may provide information 581 associated with a music playback application. The information 582 related to the music playback application may include information related to music played at a first position.

Meanwhile, the electronic device 101 may identify a change in context information. For example, the electronic device 101 may identify that the context information about the current position is changed from the first position to a second position. The electronic device 101 may identify node information corresponding to the context of the second position. The electronic device 101 may provide a reference text 571 based on node information. The electronic device 101 may provide node information 577 corresponding to the context of the second position. The node information 577 may be expressed to indicate, e.g., that it is newly provided. The electronic device 101 may provide information 577 associated with update of node information. The information 582 related to the music playback application may include information related to music played at a second position.

Figure 7A:
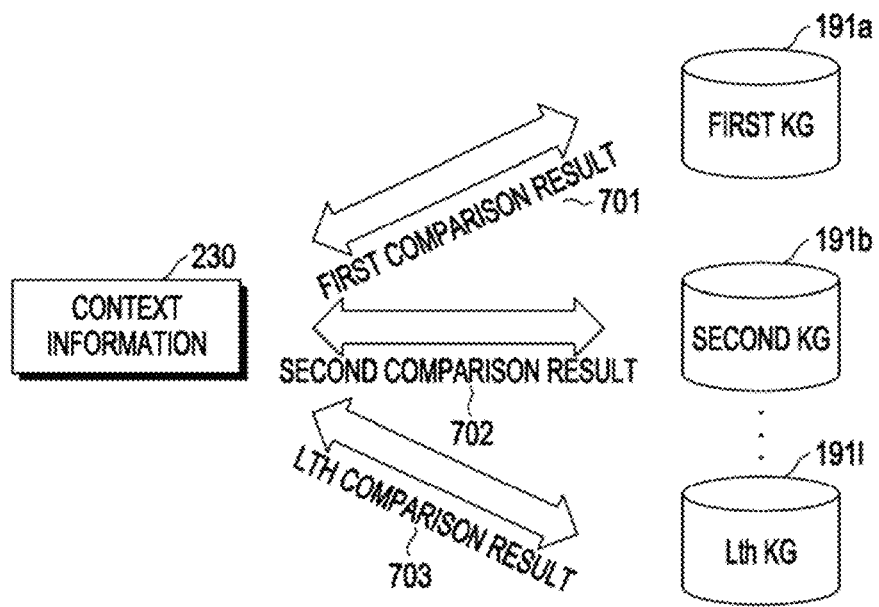
FIG. 7A, FIG. 7B, and FIG. 7C illustrate selection of one of a plurality of reference text candidates according to some embodiments.
Figure 7B:
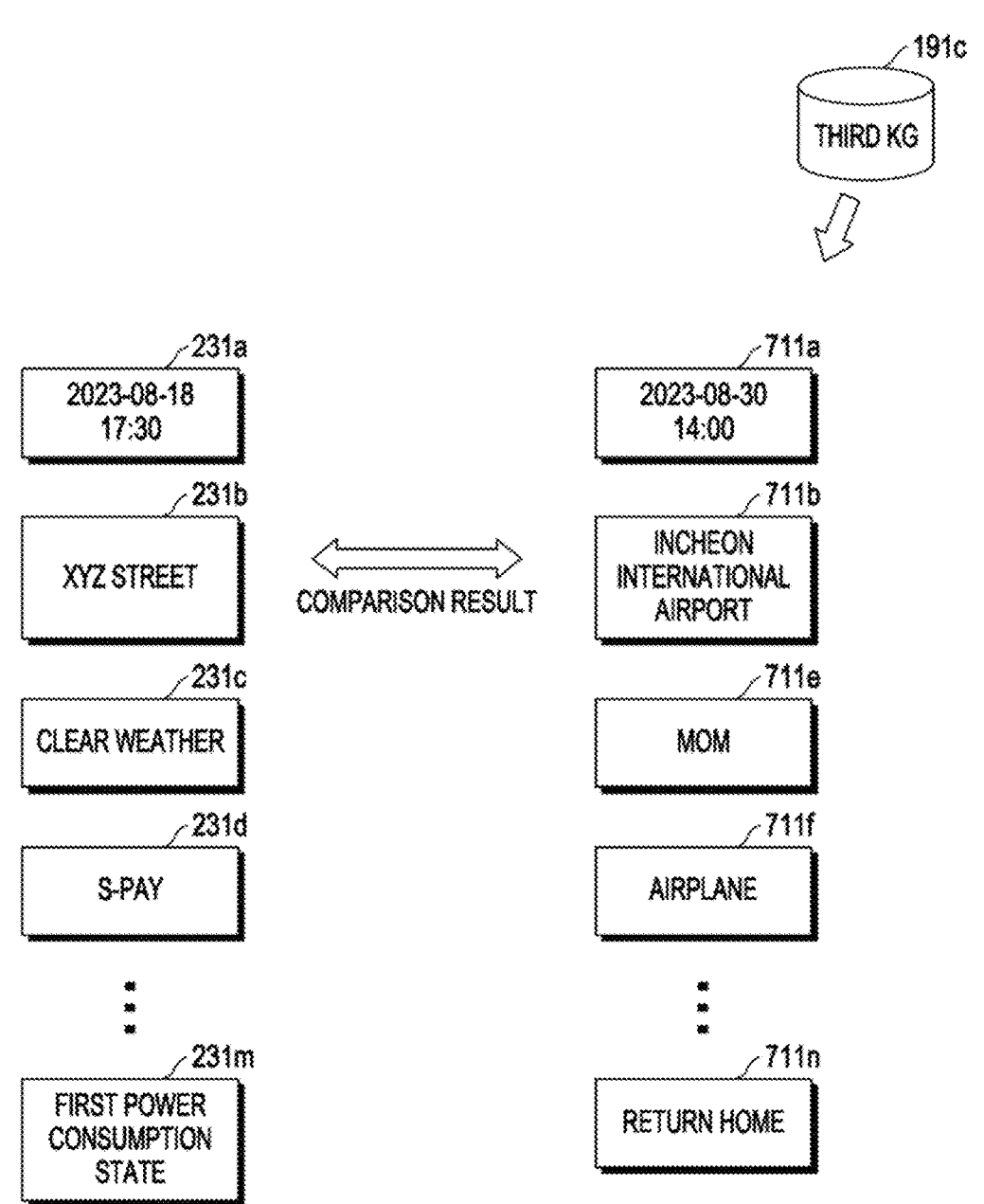
Figure 7C:
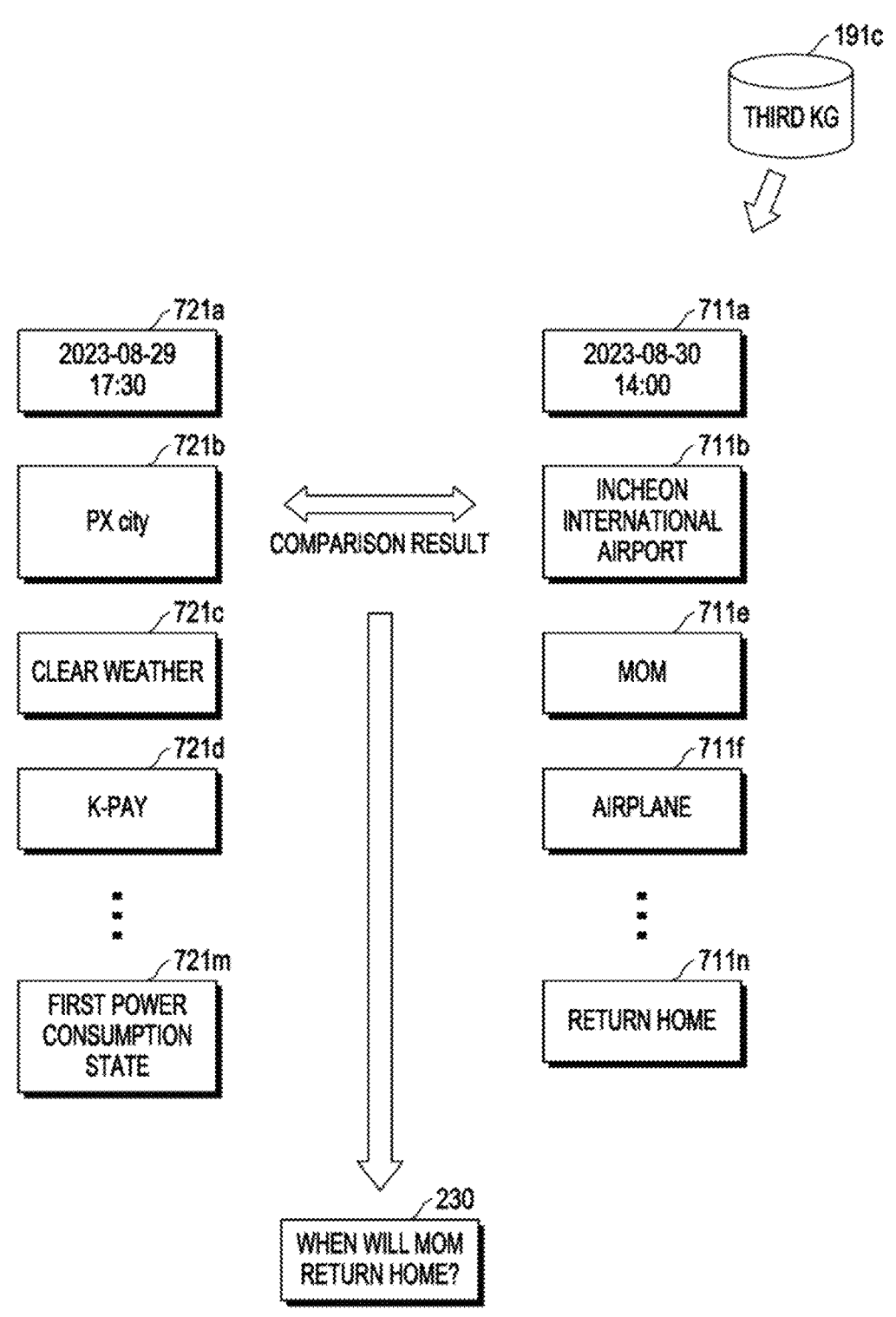

FIG. 6 is a flowchart illustrating a method for identifying a reference text according to an embodiment. The embodiment of FIG. 6 is described with reference to FIGS. 7A, 7B, and 7C. FIGS. 7A, 7B, and 7C illustrate selection of one of a plurality of reference text candidates according to various embodiments.

According to an embodiment, in operation 601, the electronic device 101 may identify the occurrence of a trigger configured to provide a search box. In operation 603, the electronic device 101 may identify, e.g., at least one piece of context information 230 as illustrated in FIG. 7A. In operation 605, the electronic device 101 may identify comparison results 701, 702, and 703 between at least one piece of context information 230 and each of the plurality of knowledge graphs 191a, 191b, . . . , and 191l. The comparison results 701, 702, and 703 may include, e.g., scores. For example, the score may be set based on a correspondence relationship between at least one piece of context information 230 and the knowledge graph.

For example, as the number of pieces of node information corresponding to at least one piece of context information 230 is relatively large, a score of a relatively high value may be identified, but the score calculation method is not limited. For example, the number of pieces of node information corresponding to the context information among the node information of the first knowledge graph may be a first number, and the number of pieces of node information corresponding to the context information among the node information of the second knowledge graph may be a second number. If the second number is greater than the first number, the second knowledge graph may be selected.

For example, a different score (which may, in this case, be referred to as a weight for each item) may be set for each item. For example, the score for a first item may be a first score, the score for a second item may be a second score, and the score for a third item may be a third score. For example, the node information of the first item of the first knowledge graph may correspond to the context information about the first item, and the node information of the second item of the first knowledge graph may correspond to the context information about the second item. In this case, the score corresponding to the first knowledge graph may be set to a sum of the first score and the second score. For example, the node information of the first item of the second knowledge graph may correspond to the context information about the first item, and the node information of the third item of the second knowledge graph may correspond to the context information about the third item. In this case, the score corresponding to the second knowledge graph may be set to a sum of the first score and the third score. If the sum of the first score and the third score is larger than the sum of the first score and the second score, the second knowledge graph may be selected. Meanwhile, the above-described score calculation method is merely exemplary. According to some embodiments, the score for each item may be a fixed value or a variable value. For example, the smaller the difference between the node information corresponding to the "time" item and the context information (i.e., the current time) corresponding to the "time" item, the higher score may be assigned. Meanwhile, the above-described score calculation methods are merely exemplary, and the calculation method is not limited.

In operation 607, the electronic device 101 may identify the first knowledge graph 191a among the plurality of knowledge graphs 191a, 191b, . . . , 191l, based on the comparison results 701, 702, and 703. For example, it is assumed that the score corresponding to the first knowledge graph 191a is higher than scores corresponding to other knowledge graphs. The electronic device 101 may identify the first knowledge graph 191a based on the highest score corresponding to the first knowledge graph 191a. In operation 609, the electronic device 101 may identify the reference text, based on the comparison result between the first knowledge graphs. In operation 611, the electronic device 101 may provide a search box in which at least part of the reference text is reflected.

For example, as shown in FIG. 7B, the electronic device 101 may compare at least one piece of context information 231a, 231b, 231c, 231d, and 231m with at least one piece of node information 711a, 711b, 711e, 711f, and 711n included in the third knowledge graph 191c. For example, node information corresponding to at least one piece of context information 231a, 231b, 231c, 231d, and 231m among at least one piece of node information 711a, 711b, 711e, 711f, and 711n may not exist, and in this case, the score corresponding to the third knowledge graph 191c may be identified as a relatively low value. The score corresponding to another knowledge graph may be larger than the score corresponding to the third knowledge graph 191c. In this case, the other knowledge graph may be selected, and the reference text based on node information corresponding to the other knowledge graph may be provided.

For example, as shown in FIG. 7C, the electronic device 101 may compare at least one piece of context information 721a, 721b, 721c, 721d, and 721m with at least one piece of node information 711a, 711b, 711e, 711f, and 711n included in the third knowledge graph 191c. The at least one piece of node information 711a, 711b, 711e, 711f, and 711n may be generated, e.g., based on information in the received message, based on information extracted from an image (e.g., an image such as an airplane ticket) in the received message (or independently received from the received message), and/or based on information registered in a calendar application, but is not limited thereto. For example, context information 721a corresponding to the current time may correspond to node information 711a of the third knowledge graph 191c. For example, for the item of time, it may be determined that both pieces of information correspond to each other based on the time difference between both the pieces of information being less than or equal to a threshold difference. For example, the score corresponding to the time item may be set to be relatively high, and accordingly, the score corresponding to the third knowledge graph 191c may be identified to be relatively high. The score corresponding to the third knowledge graph 191c may be larger than the scores corresponding to other knowledge graphs. In this case, the third knowledge graph may be selected, and a reference text 722 based on node information corresponding to the third knowledge graph may be provided. For example, the reference text 722 may be generated by further reflecting the additional text "when?" as the node information 711a corresponding to the "time" item is used.

Figures 8A, 8B:
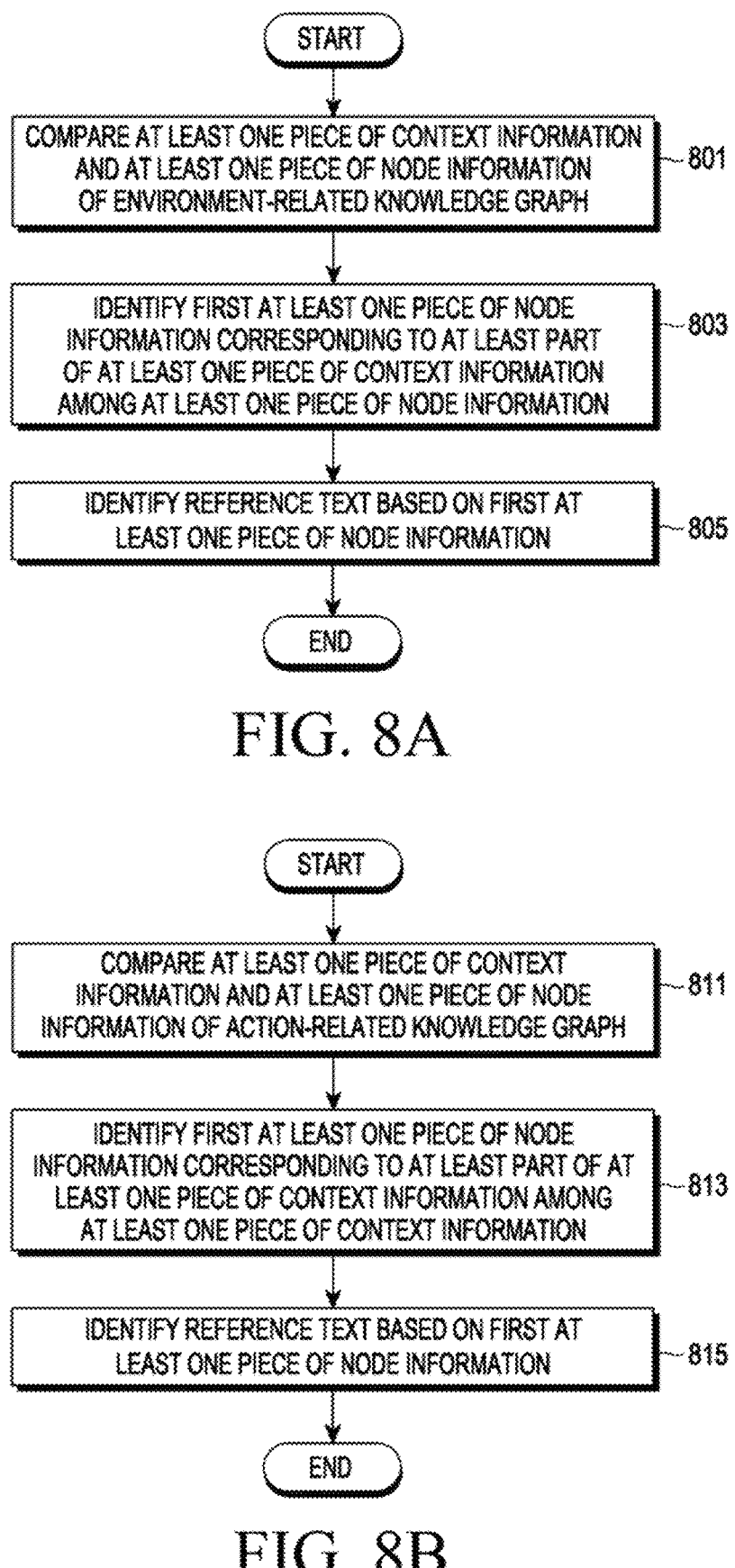
FIG. 8A is a flowchart illustrating a method for identifying a reference text according to an embodiment.
FIG. 8B is a flowchart illustrating a method for identifying a reference text according to an embodiment.

FIG. 8A is a flowchart illustrating a method for identifying a reference text according to an embodiment.

According to an embodiment, in operation 801, the electronic device 101 may compare at least one piece of context information with at least one piece of node information of an environment-related knowledge graph. In operation 803, the electronic device 101 may identify first at least one node information corresponding to at least some of at least one piece of context information among the at least one piece of node information of the environment-related knowledge graph. In operation 805, the electronic device 101 may identify the reference text based on the first at least one piece of node information.

For example, the environment-related knowledge graph may include the node information "Gangnam station" corresponding to the "place" item and the node information "restaurant" associated with "Gangnam station". The electronic device 101 may identify that "Gangnam station" of the "place" item of the context information corresponds to the node information "Gangnam station" corresponding to the "place" item of the environment-related knowledge graph. The electronic device 101 may provide a reference text such as "best restaurants near Gangnam station" based on the node information "Gangnam station" and the node information "restaurant" associated therewith.

For example, the environment-related knowledge graph may include the node information "2023-12-23" corresponding to the "time" item and the node information "mom" and "return home" associated with "2023-12-23". The electronic device 101 may identify that "2023-12-22" of the "time" item of the context information corresponds to the node information "2023-12-13" corresponding to the "time" item of the environment-related knowledge graph. The electronic device 101 may provide a reference text such as "When will mom return home?" based on the additional text "when?" with which the node information "2023-12-13" is replaced and the node information "mom" and "return home" associated with the additional text. Meanwhile, according to an embodiment, the electronic device 10 may provide the reference text "Mom returns home: 2023-12-13" including the related node information "2023-12-13".

For example, the environment-related knowledge graph may include the node information "2023-12-22" corresponding to the "time" item and the node information "meeting", "Jack" as a meeting participant, and "meeting material" associated with "2023 Dec. 22". The electronic device 101 may identify that "2023-12-22" of the "time" item of the context information corresponds to the node information "2023-12-22" corresponding to the "time" item of the environment-related knowledge graph. The electronic device 101 may provide the reference text "Who is the participant of today's meeting?" based on the additional text "Today" with which the node information "2023-12-22" is replaced, the node information "meeting" associated therewith, and the additional text of "Who is the participant?" with which "Jack" is replaced. Alternatively, the electronic device 101 may provide a reference text such as "today's meeting material" based on the additional text "today" with which the node information "2023-12-22" is replaced and the node information "meeting material" associated therewith.

For example, the environment-related knowledge graph may include the node information "2023-12-23" corresponding to the "time" item and the node information "mom" and "return home" associated with "2023-12-23". The electronic device 101 may identify that "2023-12-22" of the "time" item of the context information corresponds to the node information "2023-12-13" corresponding to the "time" item of the environment-related knowledge graph. The electronic device 101 may provide a reference text such as "When will mom return home?" based on the additional text "when?" with which the node information "2023-12-13" is replaced and the node information "mom" and "return home" associated with the additional text.

For example, the environment-related knowledge graph may include the node information "2023-12-21" corresponding to the "time" item and the node information "food" associated with "2023-12-21". The electronic device 101 may identify that "2023-12-22" of the "time" item of the context information corresponds to the node information "2023-12-21" corresponding to the "time" item of the environment-related knowledge graph. The electronic device 101 may provide a reference text such as "food eaten on Wednesday" based on the additional text "Wednesday" with which the node information "2023-12-22" is replaced, the node information "food" associated therewith, and the additional text "eaten".

FIG. 8B is a flowchart illustrating a method for identifying a reference text according to an embodiment;

According to an embodiment, in operation 811, the electronic device 101 may compare at least one piece of context information with at least one piece of node information of a behavior-related knowledge graph. In operation 813, the electronic device 101 may identify first at least one node information corresponding to at least some of at least one piece of context information among the at least one piece of node information of the action-related knowledge graph. In operation 815, the electronic device 101 may identify the reference text based on the first at least one piece of node information.

For example, the action-related knowledge graph may include at least one piece of node information of "payment information" corresponding to the "action" item. The at least one piece of node information of the "payment information" may include, e.g., "2023-12-21", "payment amount", and "payment means" (e.g., S-PAY). The electronic device 101 may identify that "S-PAY" of the "installed application" item of the context information corresponds to the node information of "S-PAY" of the action-related knowledge graph. The electronic device 101 may provide a reference text such as "money spent yesterday" based on an additional text of "money spent" with which the node information of "payment amount" is replaced and its associated additional text of "yesterday" with which "2023-12-21" is replaced.

Figure 8C:
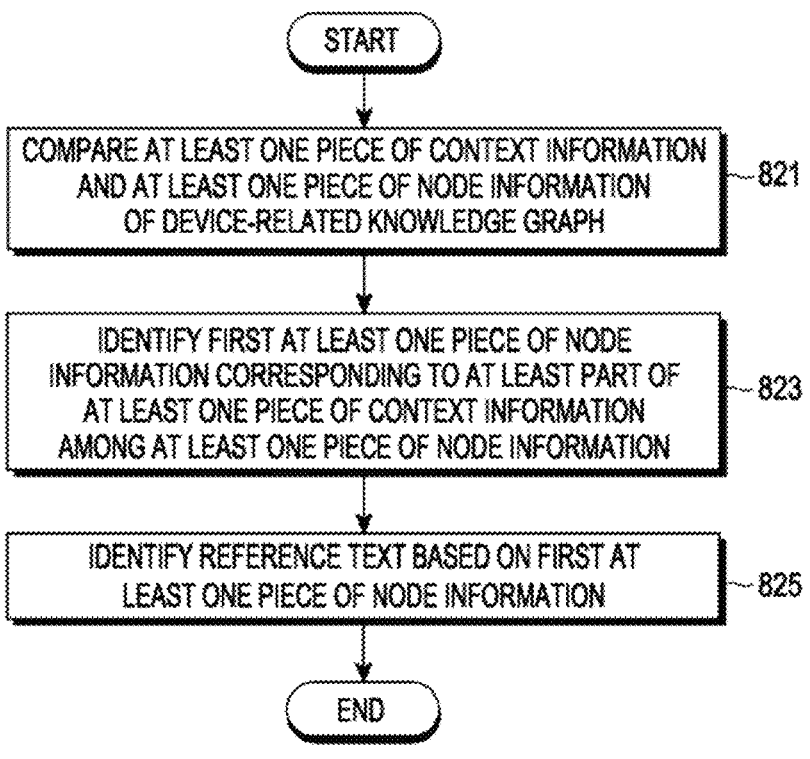
FIG. 8C is a flowchart illustrating a method for identifying a reference text according to an embodiment.

FIG. 8C is a flowchart illustrating a method for identifying a reference text according to an embodiment.

According to an embodiment, in operation 821, the electronic device 101 may compare at least one piece of context information with at least one piece of node information of a device-related knowledge graph. In operation 823, the electronic device 101 may identify first at least one node information corresponding to at least some of at least one piece of context information among the at least one piece of node information of the device-related knowledge graph. In operation 825, the electronic device 101 may identify the reference text based on the first at least one piece of node information.

For example, the device-related knowledge graph may include at least one piece of node information of "usage time" and "reduce". The electronic device 101 may identify that "mobile phone usage time over threshold time" of the context information corresponds to the node information of "usage time" of the device-related knowledge graph. The electronic device 101 may provide a reference text such as "reduce mobile phone usage time" based on the node information of "usage time" and its associated node information of "reduce" and the additional text "mobile phone". For example, when the reference text is searched, the electronic device 101 may provide an object for selecting at least one function associated with reducing the mobile phone usage time.

For example, the device-related knowledge graph may include at least one piece of node information of "carbon emissions" and "reduce". The electronic device 101 may identify that "carbon emissions" of the context information corresponds to the node information of "carbon emissions" of the device-related knowledge graph. The electronic device 101 may provide a reference text such as "reduce carbon emissions" based on the node information of "carbon emissions" and its associated node information of "reduce". For example, when the reference text is searched, the electronic device 101 may provide an object for selecting at least one function associated with reducing carbon emissions.

For example, the device-related knowledge graph may include at least one piece of node information of "optimize" and "battery usage" associated with "optimize". The electronic device 101 may identify that "battery usage over threshold usage" of the context information corresponds to the node information of "bicycle usage" of the device-related knowledge graph. The electronic device 101 may provide a reference text such as "optimize" based on the node information of "optimize" associated with "battery usage". For example, when the reference text is searched, the electronic device 101 may provide at least one object for selecting the optimization function such as reducing battery usage.

For example, the action-related knowledge graph may include the node information of "web browsing application", "S24", and "unpack" corresponding to the "preference" item. The corresponding node information may be generated based on, e.g., the "S24 unpack" search log based on the user's web browsing application, but the generation method thereof is not limited thereto. The electronic device 101 may identify that the node information of the "web browsing application" of the "recently executed application" item of the context information corresponds to the node information of "web browsing application" of the life-related knowledge graph. The electronic device 101 may provide a reference text such as "S24 unpack" based on "S24" and "unpack" associated with the node information of "web browsing application".

Figure 9:
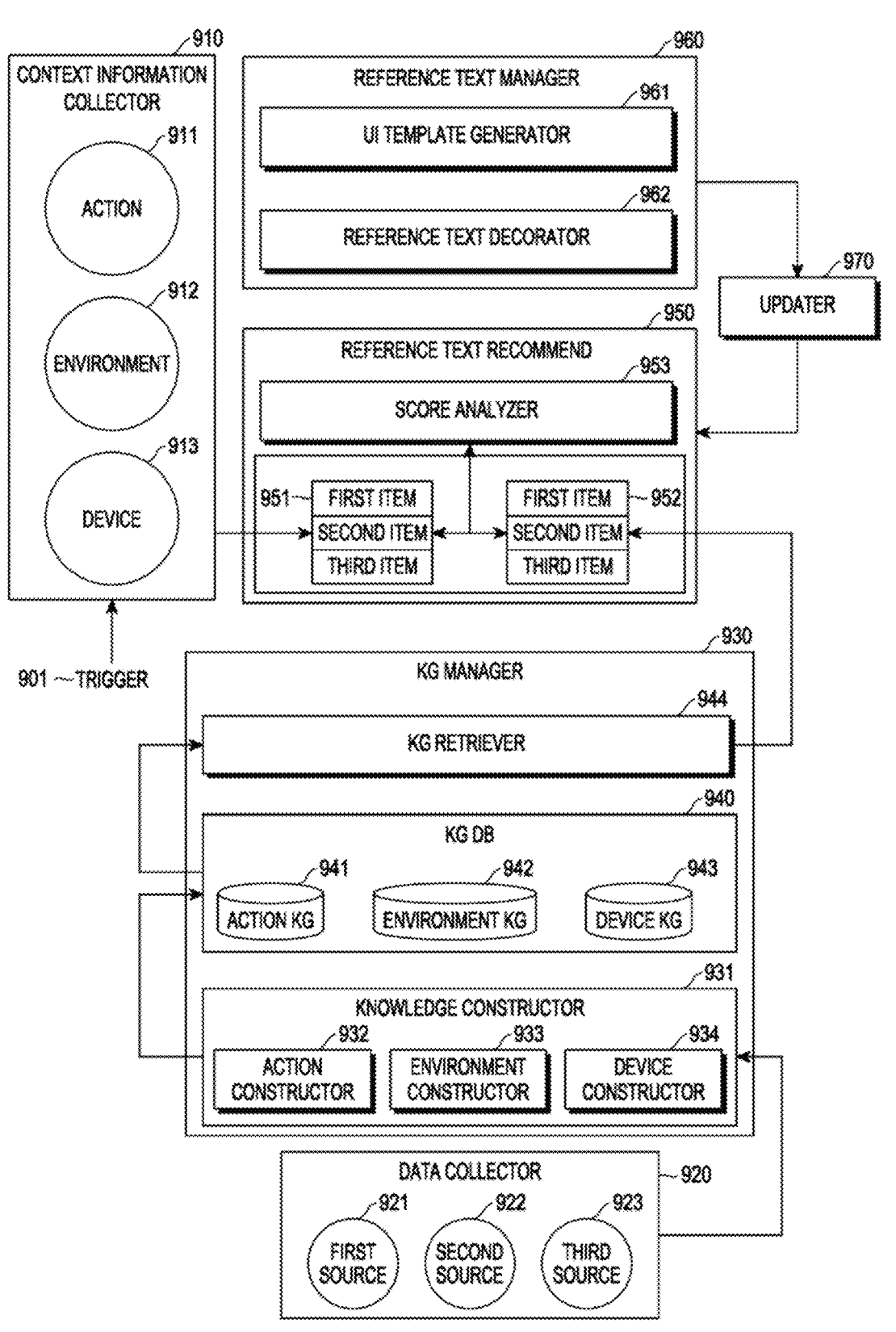
FIG. 9 is a view illustrating identifying a reference text according to an embodiment.

FIG. 9 is a view illustrating identifying a reference text according to an embodiment. For example, the entities 910, 920, 930, 960, and 970 illustrated in FIG. 9 may be executed by, e.g., the processor 120, but the subject of execution is not limited thereto, and those skilled in the art will understand that some thereof may be executed by at least one electronic device other than the electronic device 101.

According to an embodiment, a context information collector 910 may obtain context information 911 related to an action, context information 912 related to an environment, and/or context information 913 related to a device. For example, the context information collector 910 may obtain at least some of at least one piece of context information 911, 912, and 913 based on identifying the occurrence of a trigger 901, but is not limited thereto. The obtaining of the context information has been described above, and thus the description herein is not repeated. Meanwhile, the context information 911 related to the action, the context information 912 related to the environment, and/or the context information 913 related to the device are merely exemplary, and the type and/or number thereof is not limited. The action-related context information 911 may be, e.g., context information related to the user's state described with reference to FIG. 2A, and may include, e.g., user activity, biometric information identified based on the user's biometric signal, user's social activity, user's preference, and/or usage pattern, but is not limited thereto, and since each detailed information has been described with reference to FIG. 2A, the description is not repeated. The context information 912 related to the environment may include information about the current time, information about the position, and/or information about the weather, but is not limited thereto, and since each detailed information has been described with reference to FIG. 2A, the description thereof is not repeated. The context information 913 related to the device may include information about the function of the electronic device 101, information about the configuration of the electronic device 101, and/or information about the application of the electronic device 101, but is not limited thereto, and since each detailed information has been described with reference to FIG. 2A, the description thereof is not repeated.

The data collector 920 may obtain data 921 from a first source (e.g., an application), data 922 from a second source (e.g., a function management entity of the electronic device 101), and/or data 923 from a third source (e.g., a device log). However, this is exemplary, and the number and/or type of sources is not limited, and the name of data from each source is not limited.

A knowledge graph manager 930 may include, e.g., a knowledge constructor 931, a knowledge graph database 940, and/or a KG retriever 944. The knowledge constructor 931 may generate a knowledge graph based on data received from the data collector 920. For example, the knowledge constructor 931 may include, but is not limited to, an action constructor 932, an environment constructor 933, and/or a device constructor 934. The action constructor 932, the environment constructor 933, and/or the device constructor 934 may generate the action knowledge graph 941, the environment knowledge graph 942, and/or the device knowledge graph 943, respectively, and may store the same in the knowledge graph database 940. Meanwhile, in the embodiment of FIG. 9, the types of the context information

911, 912, and 913 are described as being the same as the types of the knowledge graphs 941, 942, and 943, but this is exemplary, and at least some of the context information may be different from at least some of the knowledge graphs. The knowledge graph retriever 944 may retrieve the knowledge graph and provide it to a reference text recommender 950.

The reference text recommender 950 may receive at least one piece of context information 951 from the context information collector 910. The reference text recommender 950 may receive one knowledge graph 952 from the knowledge graph manager 930. A score analyzer 953 included in the reference text recommender 950 may compare at least one piece of context information 951 with at least one piece of node information included in the knowledge graph 952. For example, the score analyzer 953 may compare at least one piece of context information 951 for each item (e.g., the first item, the second item, and the third item, but not limited thereto) with node information for each item (e.g., the first item, the second item, and the third item, but not limited thereto) of the knowledge graph 952, but is not limited thereto, and as described above, referenceless comparison may be performed rather than comparison for each item. The score analyzer 953 may provide the first score according to a comparison result between at least one piece of context information 951 and the knowledge graph 952. According to some embodiments, the score analyzer 953 may identify each of the other scores based on comparison results between each of the other knowledge graphs and at least one piece of context information 951. The reference text recommender 950 may identify a knowledge graph having the highest score among a plurality of scores. The reference text recommender 950 may provide at least one keyword based on the identified knowledge graph. As described above, at least one keyword may include at least one piece of node information corresponding to the context information and/or at least one piece of other node information directly or indirectly associated with the corresponding node information, but is not limited thereto. At least one keyword may be provided to the reference text manager 960.

The reference text decorator 962 may generate a reference text based on at least one provided keyword. For example, the reference text decorator 962 may generate a reference text by combining at least one keyword. The reference text decorator 962 may generate a reference text by omitting at least some of at least one keyword or replacing at least some of at least one keyword with another text. For example, the keyword corresponding to the time of "2023-12-22" among the keywords "mom", "return home", and "2023-12-22" may be replaced with a text for inferring a keyword such as "when?", but is not limited thereto. For example, the reference text decorator 962 may generate a reference text by adding additional text to at least some of at least one keyword. For example, the decorator 962 may generate a reference text such as "Who is the participant of today's meeting?" by adding a text for inferring "participant" such as "Who?" to the keywords "2023-10-12", "meeting," and "participant" and replacing "2023-10-12" with "today". A UI template generator 961 may provide a UI including a search box including the generated reference text and at least one object corresponding to information associated with the reference text, such as in FIG. 4B, FIG. 4C, FIG. 4D, FIG. 5C, or FIG. 5D. The provided UI may be expressed by the electronic device 101. For example, the updater 970 may discard (or adjust a score) an invalid reference text due to a data change or non-selection by the user. The execution result by the updater 970 may be provided to the reference text recommender 950. The reference text recommender 950 may discard a specific keyword or adjust a score for the specific keyword (or a corresponding knowledge graph), based on the execution result by the updater 970.

According to an embodiment, the electronic device 101 may comprise a display 160. The electronic device 101 may comprise at least one processor 120. The electronic device 101 may include memory 130. The memory 130 may, when executed by at least some of the at least one processor 120, cause the electronic device 101 to perform at least one operation. The at least one operation may include identifying an occurrence of a trigger configured to provide a search box. The at least one operation may include identifying at least one piece of context information. The at least one operation may include identifying a reference text based on a comparison result between at least part of the at least one piece of context information and at least part of the at least one piece of node information included in a first knowledge graph. The at least one operation may include providing the search box including the reference text through the display 160 in response to identifying the occurrence of the trigger.

According to an embodiment, identifying the reference text may include identifying at least one first node information corresponding to at least part of the at least one piece of context information among the at least one piece of node information included in the first knowledge graph. Identifying the reference text may include identifying the reference text based on the at least one piece of first node information.

According to an embodiment, identifying the reference text based on the at least one piece of first node information may include identifying the reference text using at least part of the at least one piece of first node information.

According to an embodiment, identifying the reference text using at least part of the at least one piece of first node information may include identifying the reference text by adding at least one first additional text to at least part of the at least one piece of first node information and/or by replacing part of at least part of the at least one piece of first node information with at least one second additional text.

According to an embodiment, identifying the reference text based on the at least one piece of first node information may include identifying the reference text using at least part of the at least one piece of first node information and at least one piece of second node information associated with the at least one piece of first node information.

According to an embodiment, identifying the reference text using at least part of the at least one piece of first node information and at least part of the at least one piece of second node information associated with the at least one piece of first node information may include identifying the reference text by adding at least one third additional text to at least part of the at least one piece of first node information and at least part of the at least one piece of second node information and/or replacing at least part of the at least one piece of first node information and part of the at least one piece of second node information with at least one fourth additional text.

According to an embodiment, identifying the at least one piece of first node information corresponding to at least part of the at least one piece of context information among the at least one piece of node information included in the first knowledge graph may include identifying the at least one piece of first node information including the same text as at least part of the at least one piece of context information and/or having a meaning associated with at least part of the at least one piece of context information.

According to an embodiment, the at least one operation may include identifying a first score corresponding to the first knowledge graph, based on a correspondence relationship between at least part of the at least one piece of context information and the at least one piece of first node information. The at least one operation may include identifying the first knowledge graph as a knowledge graph for generating the reference text, based on the first score being larger than at least one other score corresponding to at least one other knowledge graph different from the first knowledge graph.

According to an embodiment, providing the search box including the reference text through the display 160 may include providing, together with the search box, at least one first object corresponding to at least one first application and/or at least one first function associated with the at least one piece of first node information.

According to an embodiment, providing the search box including the reference text through the display 160 may include providing, together with the search box, at least one second object corresponding to the at least one piece of first node information.

According to an embodiment, providing the search box including the reference text through the display 160 may include providing, together with the search box, a soft input panel (SIP) including at least one object for inputting text.

According to an embodiment, the at least one operation may include identifying a text identified based on at least one user input to at least part of at least one object included in the SIP. The at least one operation may include identifying whether the text is identical to at least part of the reference text.

According to an embodiment, the at least one operation may include, based on the text being the same as at least part of the reference text, providing, through the display 160, the search box including the text having a first attribute and a remaining portion of the reference text having a second attribute except for the text.

According to an embodiment, the search box may further include an autocomplete object to enable the reference text to be input to the search box when designated.

According to an embodiment, the at least one operation may include providing, through the display 160, the search box reflecting the reference text based on the text being identical to at designated at least part of the reference text in a designated number or more.

According to an embodiment, the at least one operation may include stopping providing the reference text based on the text being not identical to at least part of the reference text and providing, through the display 160, the search box including the text identified based on at least one input to the SIP.

According to an embodiment, the at least one operation may include identifying at least one piece of context information at least partially different from the at least one piece of context information. The at least one operation may include identifying another reference text different from the reference text based on a comparison result between the other at least one piece of context information and at least part of the at least one piece of node information included in the first knowledge graph. The at least one operation may include providing the search box including the other reference text through the display 160.

According to an embodiment, the at least one operation may include changing the first knowledge graph. The at least one operation may include identifying another reference text different from the reference text based on a comparison result between the at least one piece of context information and at least part of the at least one piece of node information included in the changed first knowledge graph. The at least one operation may include providing the search box including the other reference text through the display 160.

According to an embodiment, there may be provided a method for providing a search box including a reference text. The method may comprise identifying an occurrence of a trigger configured to provide a search box. The method may comprise identifying at least one piece of context information. The method may comprise identifying a reference text based on a comparison result between at least part of the at least one piece of context information and at least part of the at least one piece of node information included in a first knowledge graph. The method may comprise providing the search box including the reference text in response to identifying the occurrence of the trigger.

According to an embodiment, there may be provided a computer-readable storage medium storing at least one instruction. The at least one instruction may, when executed by a processor 120 of an electronic device 101, enable the electronic device 101 to perform at least one operation. The at least one operation may comprise identifying an occurrence of a trigger configured to provide a search box. The at least one operation may comprise identifying at least one piece of context information. The at least one operation may comprise identifying a reference text based on a comparison result between at least part of the at least one piece of context information and at least part of the at least one piece of node information included in a first knowledge graph. The at least one operation may comprise providing the search box including the reference text through the display 160 in response to identifying the occurrence of the trigger.

According to some embodiments, the use of knowledge graphs may enable a referenceless comparison, rather than comparison for each item. Consequently, the comparison may reduce the computational load required to perform the search process, and efficiency of the searching process may be improved.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device, comprising:
a display;
at least one processor; and
at least one memory storing a knowledge graph, wherein the at least one memory stores instructions that, when executed by the at least one processor, cause the electronic device to perform operations, and
wherein the operations include:
based on an occurrence of a trigger, identifying context information corresponding to a state of the electronic device;
comparing the context information with one or more nodes of the knowledge graph;
identifying, among the one or more nodes of the knowledge graph, at least one node that corresponds to the context information;
displaying, in a search box through the display, a first reference text determined based on the context information and the at least one node of the knowledge graph;
displaying, in the search box through the display, a text corresponding to the first reference text according to a user input identical to part of the first reference text, wherein the text is displayed according to a first attribute and a remaining portion of the first reference text is displayed according to a second attribute based on the text being identical to the part of the first reference text;
based on the text corresponding to the first reference text and the at least one node of the knowledge graph, searching for a first content; and
displaying, through the display, the first content obtained from the search based on the text corresponding to the first reference text and the at least one node of the knowledge graph.

2. The electronic device of claim 1,
wherein the operations further include:
identifying a change in the context information in a state in which the searched first content is displayed;
searching for a second content related to the text and the at least one node of the knowledge graph according to the change in the context information; and
displaying, through the display, the searched second content in replacement of the first content.

3. The electronic device of claim 2,
wherein the operations further include:
displaying a reason for displaying the second content in replacement of the first content, based on the context information and information associated with the at least one node of the knowledge graph.

4. The electronic device of claim 2,
wherein the operations further include:
based on the change in the context information, displaying, through the display, a second reference text determined based on the at least one node of the knowledge graph in replacement of the text in the search box.

5. The electronic device of claim 4,
wherein the operations further include:
identifying second context information according to an occurrence of a second trigger in the state in which the searched first content is displayed;
determining whether a difference between a value corresponding to the context information and a value corresponding to the second context information is within a predetermined range;
when the difference between the value of the context information and the value of the second context information not being within the predetermined range, searching for and displaying the second content related to the text and the at least one node of the knowledge graph; and
based on the difference between the context information and the second context information being within the predetermined range, maintaining the display of the first content related to the at least one node of the knowledge graph.

6. The electronic device of claim 5,
wherein, when the value of the context information and the value of the second context information are related to a distance,
wherein the searching for and displaying the second content includes:
based on a difference between a first distance of the context information and a second distance of the second context information not being within a predetermined distance, searching for and displaying the second content related to the text and the at least one node of the knowledge graph, and
wherein the maintaining the display of the first content includes:
based on the difference between the first distance of the context information and the second distance of the second context information being within the predetermined distance, maintaining the display of the first content related to the at least one node of the knowledge graph.

7. The electronic device of claim 5,
wherein when the value of the context information and the value of the second context information are related to a time,
wherein the searching for and displaying the second content includes:
based on a difference between a first time of the context information and a second time of the second context information not being within a predetermined time, searching for and displaying the second content related to the text and the at least one node of the knowledge graph, and
wherein the maintaining the display of the first content includes:
based on the difference between the first time of the context information and the second time of the second context information being within the predetermined time, maintaining the display of the first content related to the at least one node of the knowledge graph.

8. The electronic device of claim 1,
wherein the operations further include:
    identifying at least one first node corresponding to the context information among the at least one node of the knowledge graph; and
    identifying the first reference text, based on the at least one first node.

9. The electronic device of claim 8,
wherein the identifying the first reference text based on the at least one first node includes:
    identifying the first reference text using at least part of the at least one first node.

10. The electronic device of claim 9,
wherein the identifying the first reference text using the at least part of the at least one first node includes at least one of:
    identifying the first reference text by adding at least one first additional text to the at least part of the at least one first node, or
    replacing the at least part of the at least one first node with at least one second additional text.

11. The electronic device of claim 8,
wherein the identifying the first reference text based on the at least one first node includes:
    identifying the first reference text using at least part of the at least one first node and at least part of at least one second node associated with the at least one first node.

12. The electronic device of claim 11,
wherein the identifying the first reference text using the at least part of the at least one first node and the at least part of the at least one second node associated with the at least one first node includes:
identifying the first reference text by adding at least one third additional text to the at least part of the at least one first node and the at least part of the at least one second node, and/or replacing the at least part of the at least one first node and the at least part of the at least one second node with at least one fourth additional text.

13. The electronic device of claim 12,
wherein the identifying the at least one first node corresponding to at least part of at least one piece of the context information among the at least one node of the knowledge graph includes:
    identifying the at least one first node including a same text as the at least part of the at least one piece of the context information and/or having a meaning associated with the at least part of the at least one piece of the context information.

14. The electronic device of claim 13,
wherein the operations further include:
    identifying a first score corresponding to the knowledge graph, based on a correspondence relationship between the at least part of the at least one piece of the context information and the at least one first node; and
    identifying the knowledge graph as a knowledge graph for generating the first reference text, based on the first score being greater than at least one other score corresponding to at least one other knowledge graph different from the knowledge graph.

15. The electronic device of claim 1,
wherein the first content comprises at least one first object corresponding to at least one first application and/or at least one first function corresponding to at least one first node.

16. The electronic device of claim 1,
wherein the first content comprises at least one second object corresponding to at least one first node.

17. The electronic device of claim 1,
wherein the operations further include:
    changing the knowledge graph;
    identifying another reference text different from the first reference text, based on a comparison result between at least one piece of the context information and at least part of at least one node of the changed knowledge graph; and
    displaying, through the display, the search box comprising the other reference text.

18. A method for operating an electronic device, the method comprising:
    based on an occurrence of a trigger, identifying context information corresponding to a state of the electronic device;
    comparing the context information with one or more nodes of the knowledge graph;
    identifying, among the one or more nodes of the knowledge graph, at least one node that corresponds to the context information;
    displaying, in a search box through a display, a first reference text determined based on the context information and the at least one node of the knowledge graph;
    displaying, in the search box through the display, a text corresponding to the first reference text according to a user input identical to part of the first reference text, wherein the text is displayed according to a first attribute and a remaining portion of the first reference text is displayed according to a second attribute based on the text being identical to the part of the first reference text;
    based on the text corresponding to the first reference text and the at least one node of the knowledge graph, searching for a first content; and
    displaying, through the display, the first content obtained from the search based on the text corresponding to the first reference text and the at least one node of the knowledge graph.

19. A storage medium storing computer-readable instructions, the instructions, when executed by at least one processor of an electronic device, cause the electronic device to perform operations,
wherein the operations comprise:
    based on an occurrence of a trigger, identifying context information corresponding to a state of the electronic device;
    comparing the context information with one or more nodes of the knowledge graph;
    identifying, among the one or more nodes of the knowledge graph, at least one node that corresponds to the context information;
    displaying, in a search box through a display, a first reference text determined based on the context information and the at least one node of the knowledge graph;
    displaying, in the search box through the display, a text corresponding to the first reference text according to a user input identical to part of the first reference text, wherein the text is displayed according to a first attribute and a remaining portion of the first reference text is displayed according to a second attribute based on the text being identical to the part of the first reference text;

based on the text corresponding to the first reference text and the at least one node of the knowledge graph, searching for a first content; and displaying, through the display, the first content obtained from the search based on the text corresponding to the first reference text and the at least one node of the knowledge graph.

\* \* \* \* \*